United States Patent
Hong

(10) Patent No.: US 11,910,468 B2
(45) Date of Patent: Feb. 20, 2024

(54) METHOD FOR PERFORMING COMMUNICATION BY USING NON-TERRESTRIAL NETWORK AND APPARATUS THEREOF

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 455 days.

(21) Appl. No.: 17/282,743

(22) PCT Filed: Sep. 30, 2019

(86) PCT No.: PCT/KR2019/012687
§ 371 (c)(1),
(2) Date: Apr. 2, 2021

(87) PCT Pub. No.: WO2020/071698
PCT Pub. Date: Apr. 9, 2020

(65) Prior Publication Data
US 2022/0007455 A1    Jan. 6, 2022

(30) Foreign Application Priority Data

Oct. 5, 2018 (KR) .................. 10-2018-0119338
Sep. 26, 2019 (KR) .................. 10-2019-0118534

(51) Int. Cl.
*H04W 76/28* (2018.01)
*H04L 1/1867* (2023.01)
*H04W 84/06* (2009.01)

(52) U.S. Cl.
CPC .......... *H04W 76/28* (2018.02); *H04L 1/1883* (2013.01); *H04W 74/0833* (2013.01); *H04W 84/06* (2013.01)

(58) Field of Classification Search
CPC . H04W 76/28; H04W 74/0833; H04W 56/00; H04W 52/0229; H04W 84/06; H04L 1/1883; H04L 9/40
See application file for complete search history.

(56) References Cited

U.S. PATENT DOCUMENTS

| 6,882,841 B1 | 4/2005 | Youn |
| 2019/0339701 A1 | 11/2019 | Pedersen et al. |

(Continued)

FOREIGN PATENT DOCUMENTS

| KR | 10-0413419 B1 | 2/2004 |
| WO | 2018/106763 A1 | 6/2018 |
| WO | 2018/125686 A2 | 7/2018 |

OTHER PUBLICATIONS

Nomor Research Gmbh et al., "Considerations on MAC Control Loops and Timings in Non-Terrestrial Networks (NTN)", R2-1813615, 3GPP TSG-RAN WG2 Meeting # 103-Bis, Chengdu, China, Oct. 8-12, 2018, pp. 1-6.

(Continued)

*Primary Examiner* — Vinncelas Louis
(74) *Attorney, Agent, or Firm* — IP Legal Services, LLC

(57) ABSTRACT

Provided are a terminal and a network node and method thereof for performing communication in a non-terrestrial network. The method includes receiving system information including reference round trip delay offset information of a non-terrestrial network cell, performing a random access procedure in the non-terrestrial network cell; receiving configuration information for performing communication using the non-terrestrial network cell, and controlling a discontinuous reception (DRX) operation on the basis of the configuration information.

12 Claims, 19 Drawing Sheets

(56) References Cited

U.S. PATENT DOCUMENTS

| | | |
|---|---|---|
| 2019/0364492 A1 | 11/2019 | Azizi et al. |
| 2020/0205062 A1 | 6/2020 | Azizi et al. |
| 2021/0072756 A1 | 3/2021 | Pedersen et al. |
| 2021/0329731 A1* | 10/2021 | Gu .................... H04W 52/0229 |
| 2022/0006514 A1* | 1/2022 | Sedin ................... H04L 1/1883 |

OTHER PUBLICATIONS

Spreadtrum Communications, "Overview of NTN impacts to RAN2", R2-1813881, 3GPP TSG-RAN WG2 Meeting #103bis, Chengdu, China, Oct. 8-12, 2018.

* cited by examiner

FIG.11

*DRX-Config information element*

```
DRX-Config ::=              SEQUENCE {
    drx-onDurationTimer         CHOICE {
                                    subMilliSeconds INTEGER (1..31),
                                    milliSeconds    ENUMERATED {
                                            ms1, ms2, ms3, ms4, ms5, ms6, ms8, ms10, ms20, ms30, ms40, ms50, ms60,
                                            ms80, ms100, ms200, ms300, ms400, ms500, ms600, ms800, ms1000, ms1200,
                                            ms1600, spare8, spare7, spare6, spare5, spare4, spare3, spare2, spare1 }
                                },
    drx-InactivityTimer         ENUMERATED {
                                    ms0, ms1, ms2, ms3, ms4, ms5, ms6, ms8, ms10, ms20, ms30, ms40, ms50, ms60, ms80,
                                    ms100, ms200, ms300, ms500, ms750, ms1280, ms1920, ms2560, spare9, spare8,
                                    spare7, spare6, spare5, spare4, spare3, spare2, spare1},
    drx-HARQ-RTT-TimerDL        INTEGER (0..56),
    drx-HARQ-RTT-TimerUL        INTEGER (0..56),
    drx-RetransmissionTimerDL   ENUMERATED {
                                    sl0, sl1, sl2, sl4, sl6, sl8, sl16, sl24, sl33, sl40, sl64, sl80, sl96, sl112, sl128,
                                    sl160, sl320, spare15, spare14, spare13, spare12, spare11, spare10, spare9,
                                    spare8, spare7, spare6, spare5, spare4, spare3, spare2, spare1},
```

METHOD FOR PERFORMING COMMUNICATION BY USING NON-TERRESTRIAL NETWORK AND APPARATUS THEREOF

CROSS REFERENCE TO RELATED APPLICATIONS

This application is a National Stage Patent Application of PCT International Patent Application No. PCT/KR2019/012687 (filed on Sep. 30, 2019) under 35 U.S.C. § 371, which claims priority to Korean Patent Application Nos. 10-2018-0119338 (filed on Oct. 5, 2018) and 10-2019-0118534 (filed on Sep. 26, 2019), the teachings of which are incorporated herein in their entireties by reference.

TECHNICAL FIELD

The disclosure provides techniques related to performing communication using a non-terrestrial network between a user equipment (UE) and a network node.

BACKGROUND ART

The amount of data transmission and reception using wireless communication technology is increasing rapidly according to the increase in the spread of cellular phones and the like, and various types of wireless communication devices are introduced. In addition, as the importance of low latency is highlighted, development of a next-generation wireless communication technology (New RAT) after LTE technology is in progress.

In addition, the number of terminals (e.g., UEs) performing communication using the wireless communication technology is increasing abruptly, and there is a large demand for communication in various environments and locations. In this situation, it is necessary to provide a communication service with a further wider coverage and even in an environment where a base station connected by wire may not be established.

To this end, many researches have been conducted on non-terrestrial networks that are wirelessly linked to core networks in the air, not base stations built on the ground. The non-terrestrial network refers to a network or segment of a network that uses airborne vehicles such as HAPS (High Altitude Platform) or spaceborne vehicles such as satellites for transmission.

However, in the case of the non-terrestrial network the physical distance between the terminal and the core network is very far compared to the terrestrial network. Accordingly, it is necessary to change a protocol in consideration of the delay time.

DETAILED DESCRIPTION OF THE INVENTION

Technical Problem

The embodiments provide a method and an apparatus to perform communication using a non-terrestrial network between a user equipment (UE) and a network node.

Technical Solution

According to an embodiment of the disclosure, a method may be provided for performing communication using a non-terrestrial network by the user equipment (UE). The method may include receiving system information comprising reference round trip delay offset information of a non-terrestrial network cell; performing a random access procedure in the non-terrestrial network cell; receiving configuration information that is necessary to perform communication by using the non-terrestrial network cell; and controlling a discontinuous reception (DRX) operation based on the configuration information.

According to an embodiment of the disclosure, a method may be provided for performing communication using a non-terrestrial network with the user equipment (UE) by a network node. The method may include transmitting system information comprising reference round trip delay offset information of a non-terrestrial network cell; performing a random access procedure with the UE in the non-terrestrial network cell; and transmitting configuration information that is necessary to perform communication by using the non-terrestrial network cell.

According to an embodiment of the disclosure, a UE may be provided for performing communication using a non-terrestrial network. The UE may include a receiver configured to receive system information comprising reference round trip delay offset information of a non-terrestrial network cell and configuration information that is necessary to perform communication by using the non-terrestrial network cell; and a controller configured to perform a random access procedure in the non-terrestrial network cell and control a discontinuous reception (DRX) operation based on the configuration information.

According to an embodiment of the disclosure, a network node may be provided for performing communication using a non-terrestrial network with a user equipment (UE). The network node may include a transmitter transmitting system information comprising reference round trip delay offset information of a non-terrestrial network cell and system information comprising reference round trip delay offset information of a non-terrestrial network cell; and a controller performing a random access procedure with the UE in the non-terrestrial network cell.

Advantageous Effects

The Embodiments may provide the method and the apparatus to perform communication using a non-terrestrial network between a user equipment (UE) and a network node.

BRIEF DESCRIPTION OF DRAWINGS

The above and other aspects, features, and advantages of the disclosure will be more apparent from the following detailed description taken in conjunction with the accompanying drawings, in which.

FIG. 11 is a view exemplarily illustrating a DRX configuration information element according to an embodiment.

MODE FOR CARRYING OUT THE INVENTION

Figure 1:
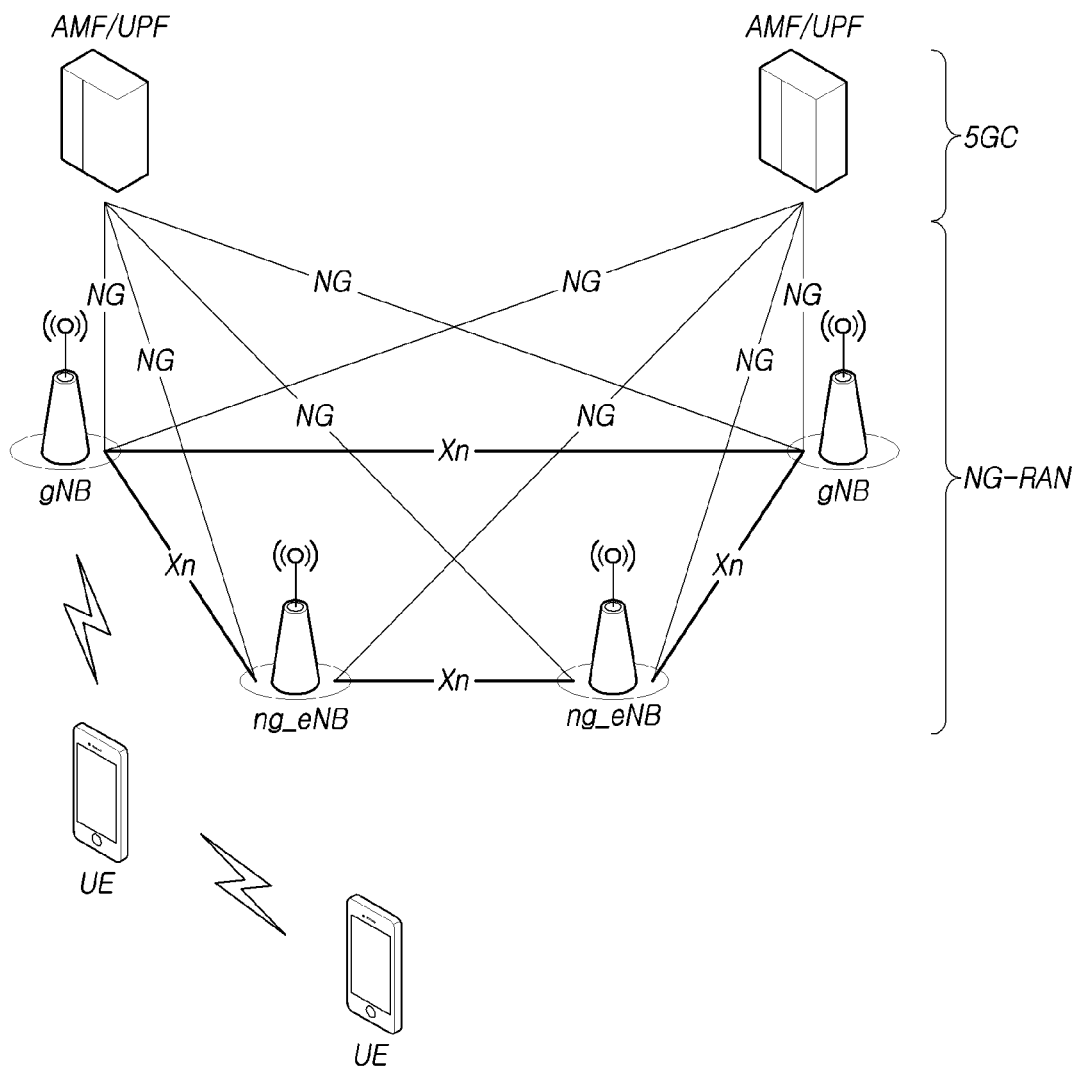
FIG. 1 is a view schematically illustrating an NR wireless communication system in accordance with embodiments of the disclosure.

Hereinafter, some embodiments of the disclosure will be described in detail with reference to the accompanying illustrative drawings. In the drawings, like reference numerals are used to denote like elements throughout the drawings, even if they are shown on different drawings. Further, in the following description of the disclosure, a detailed description of known functions and configurations incorporated herein will be omitted when it may make the subject matter of the disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
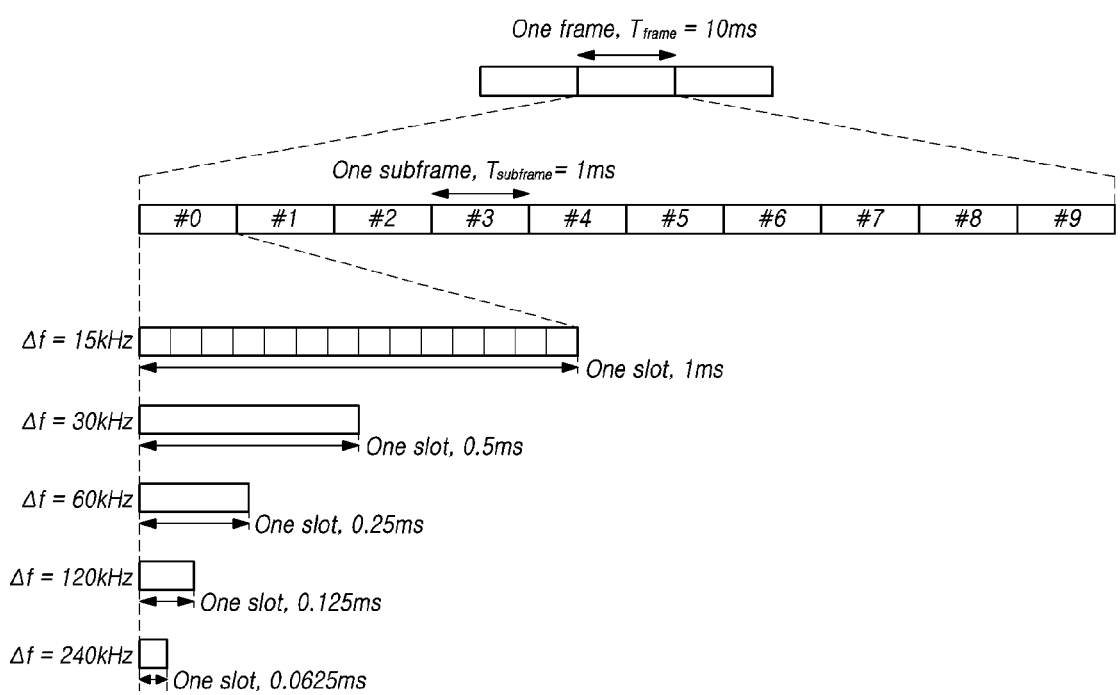
FIG. 2 is a view schematically illustrating a frame structure in an NR system in accordance with embodiments of the disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
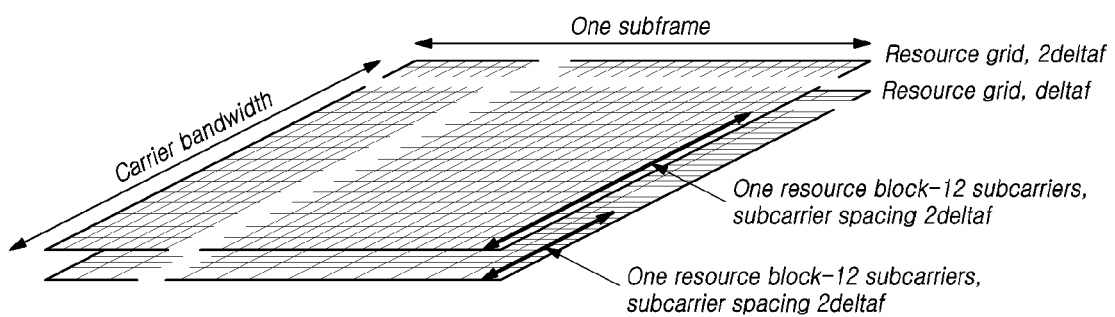
FIG. 3 is a view for explaining resource grids supported by a radio access technology in accordance with embodiments of the disclosure.

FIG. 3 illustrates resource grids supported by a radio access technology in accordance with embodiments of the disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
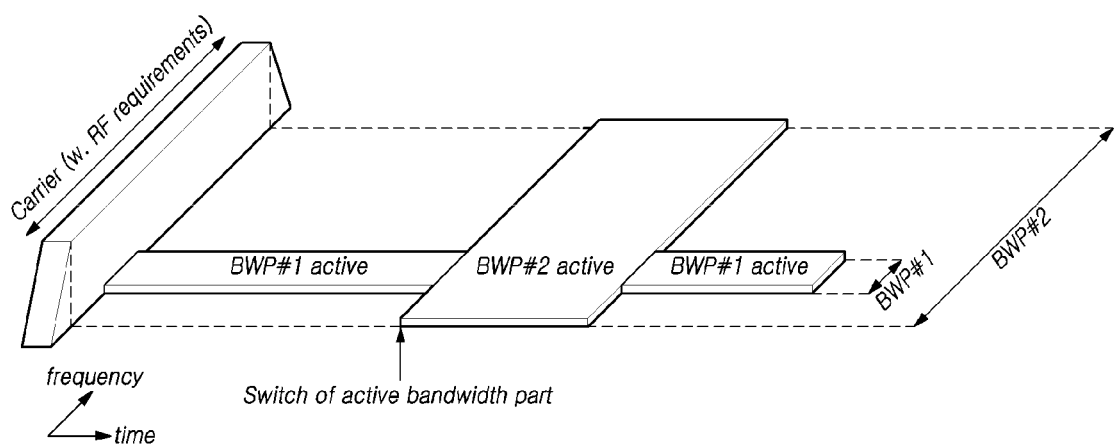
FIG. 4 is a view for explaining bandwidth parts supported by a radio access technology in accordance with embodiments of the disclosure.

FIG. 4 illustrates bandwidth parts supported by a radio access technology in accordance with embodiments of the disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
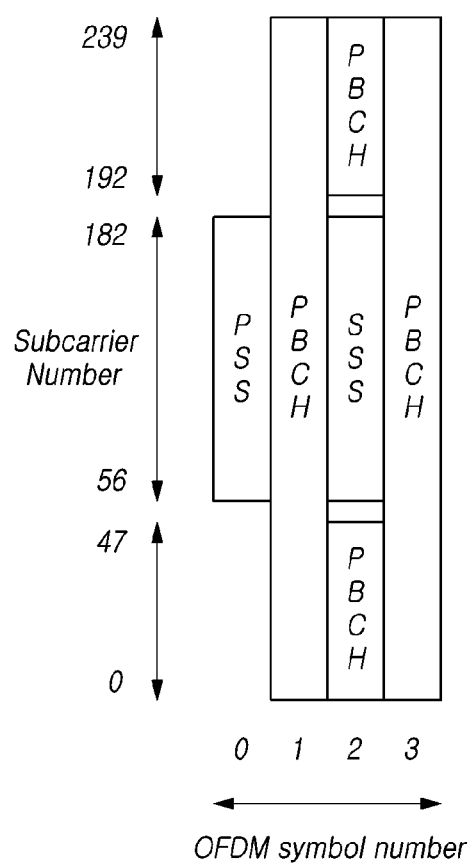
FIG. 5 is a view illustrating an example of a synchronization signal block in a radio access technology in accordance with embodiments of the disclosure.

FIG. 5 illustrates an example of a synchronization signal block in a radio access technology in accordance with embodiments of the disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
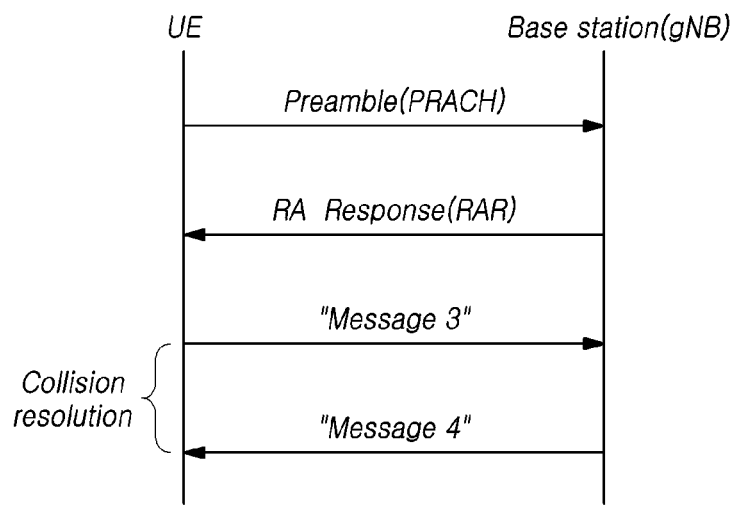
FIG. 6 is a signal diagram for explaining a random access procedure in a radio access technology in accordance with embodiments of the disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
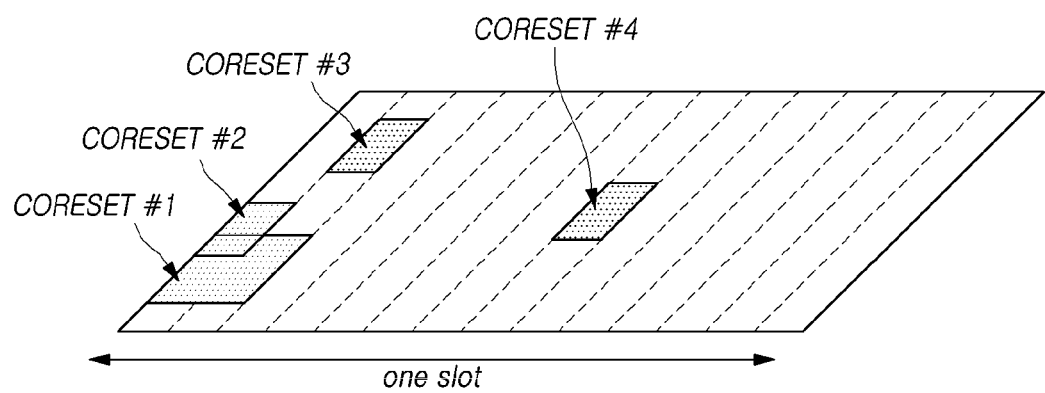
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR(New Radio)

The 3GPP introduced the NR, a next-generation wireless communication technology. That is, the NR is radio access technology that may provide an enhanced data rate compared to LTE and may satisfy various QoS requirements required for specific and detailed usage scenarios. In particular, as a representative NR usage scenario, eMBB (enhancement Mobile Broadband), mMTC (massive MTC) and URLLC (Ultra Reliable and Low Latency Communications) have been defined. In order to meet the requirements for each scenario, it is required to design a frame structure more flexible as compared to that of LTE. The frame structure of the NR supports a frame structure based on multiple subcarriers. The basic subcarrier spacing (SCS) is 15 kHz, and a total of 5 SCS types are supported at 15 kHz*2^n.

Figure 8:
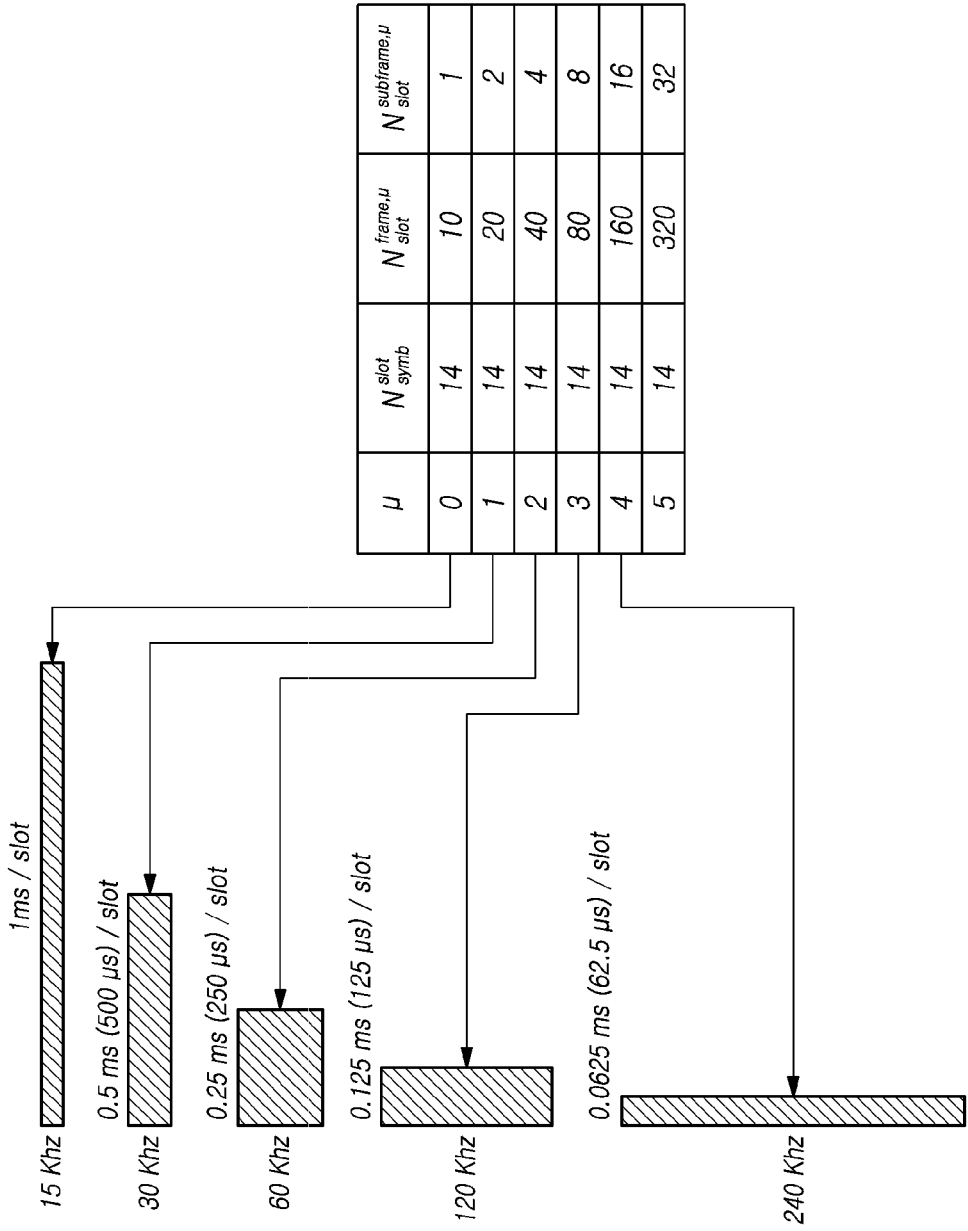
FIG. 8 is a view illustrating different subcarrier spacings arranged at a symbol level.

FIG. 8 is a view illustrating different subcarrier spacings arranged at a symbol level.

As shown in FIG. 8, the length of the time axis of the slot varies depending on the numerology. That is, the shorter the slot length, the larger the SCS. In this case, the number (y value) of OFDM symbols constituting a corresponding slot is determined to be 14 (e.g., y=14) regardless of the SCS value in the case of normal CP. Therefore, one slot is made up of 14 symbols. Further, depending on the transmission direction of the corresponding slot, all the symbols may be used for DL transmission, or all the symbols may be used for UL transmission, or the symbols may be used in the form of DL portion+(gap)+UL portion.

Further, in a numerology (or SCS), a mini-slot is defined. The mini-slot is constituted of a smaller number of symbols than the typical slot described above. For minislot-based uplink/downlink data transmission/reception, a short-length time-domain scheduling interval may be configured, or a long-length time-domain scheduling interval for uplink/downlink data transmission/reception may be configured via slot aggregation. In particular, in the case of transmission and reception of latency-sensitive data, such as URLLC, it is difficult to satisfy the latency requirements if scheduling is performed in slot units which are based on 1 ms (14 symbols) as defined in the numerology-based frame structure which has a small SCS value, e.g., 15 kHz. Thus, a mini-slot is defined to be constituted of a smaller number of OFDM symbols than the slot constituted of 14 symbols. Based thereupon, scheduling capable of meeting the URLLC requirements may be carried out.

Figure 9:
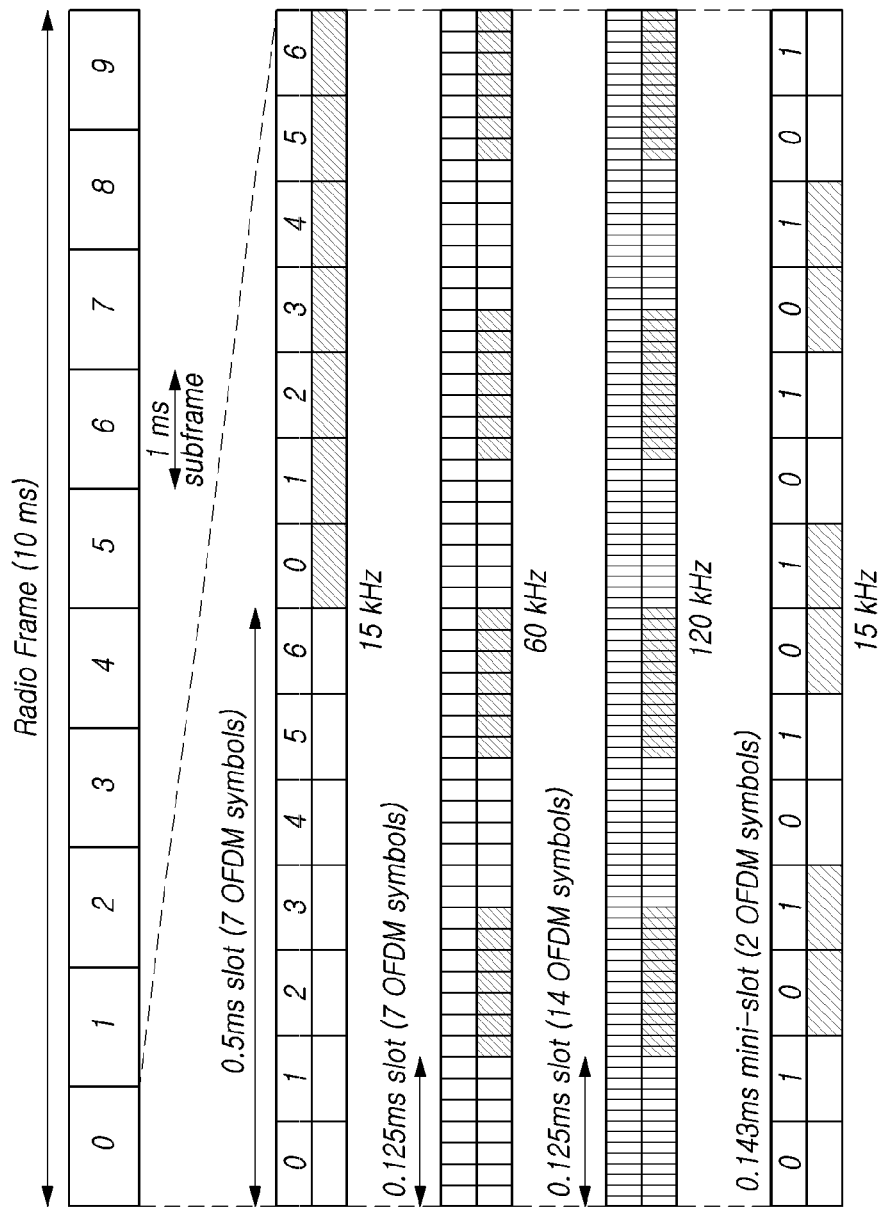
FIG. 9 is a view for explaining a time domain structure in a next-generation wireless communication system.

FIG. 9 is a view for explaining a time domain structure in a next-generation wireless communication system.

Referring to FIG. 9, in the NR, the following structure is supported on the time axis. Unlike the typical LTE, the basic scheduling unit is changed to the above described slot in the NR. Also, regardless of the subcarrier spacing, as shown in FIG. 9, a slot made up of 14 OFDM symbols. On the other hand, it supports a non-slot structure (mini-slot structure) composed of 2, 4, and 7 OFDM symbols, which are smaller scheduling units. The non-slot structure may be used as a scheduling unit for URLLC service.

Radio frame: Fixed 10 ms regardless of the numerology.

Subframe: Fixed 1 ms as a reference for time duration. It is not used for data/control scheduling unit, different from the LTE.

lot: Mainly used for eMBB. It includes 14 OFDM symbols.

Non-slot (i.e. mini-slot): Mainly used for URLLC, but not limited to URLLC only. It includes 2, 4, or 7 OFDM symbols.

One TTI duration: A Time duration for data/control channel transmission. A number of OFDM symbols per a slot/non-slot in the time main.

Non-Terrestrial Network

The non-terrestrial network refers to a network or segment of a network that uses airborne vehicles such as HAPS (High Altitude Platform) or spaceborne vehicles such as satellites for transmission.

Spaceborne vehicles: Satellites (including Low Earth Orbiting (LEO) satellites, Medium Earth Orbiting (MEO) satellites, Geostationary Earth Orbiting (GEO) satellites as well as Highly Elliptical Orbiting (HEO) satellites).

Airborne vehicles: High Altitude Platforms (HAPs) encompassing Unmanned Aircraft Systems (UAS) including Lighter than Air UAS (LTA), Heavier than Air UAS (HTA), all operating in altitudes typically between 8 and 50 km, quasi-stationary.

The 3GPP developed and introduced a technology that supports NR operation in the non-terrestrial network using the aforementioned satellite or air transport vehicle. However, in the non-terrestrial network, the distance between a base station and a UE is longer than that of a terrestrial network using a terrestrial base station. Accordingly, a very large round trip delay (RTD) may occur. For example, in an NTN scenario using GEO located at an altitude of 35,768 km, the RTD is known to be 544.751 ms, and in an NTN scenario using HAPS located at an altitude of 229 km, the RTD is known to be 3.053 ms. In addition, the RTD in the NTN scenario using the LEO satellite system may appear up to 25.76 ms. As described above, in order to perform a communication operation to which the NR protocol is applied in the non-terrestrial network, there is a demand of a technology for supporting the base station and the UE to perform the NR operation even under such propagation delay.

Figure 10:
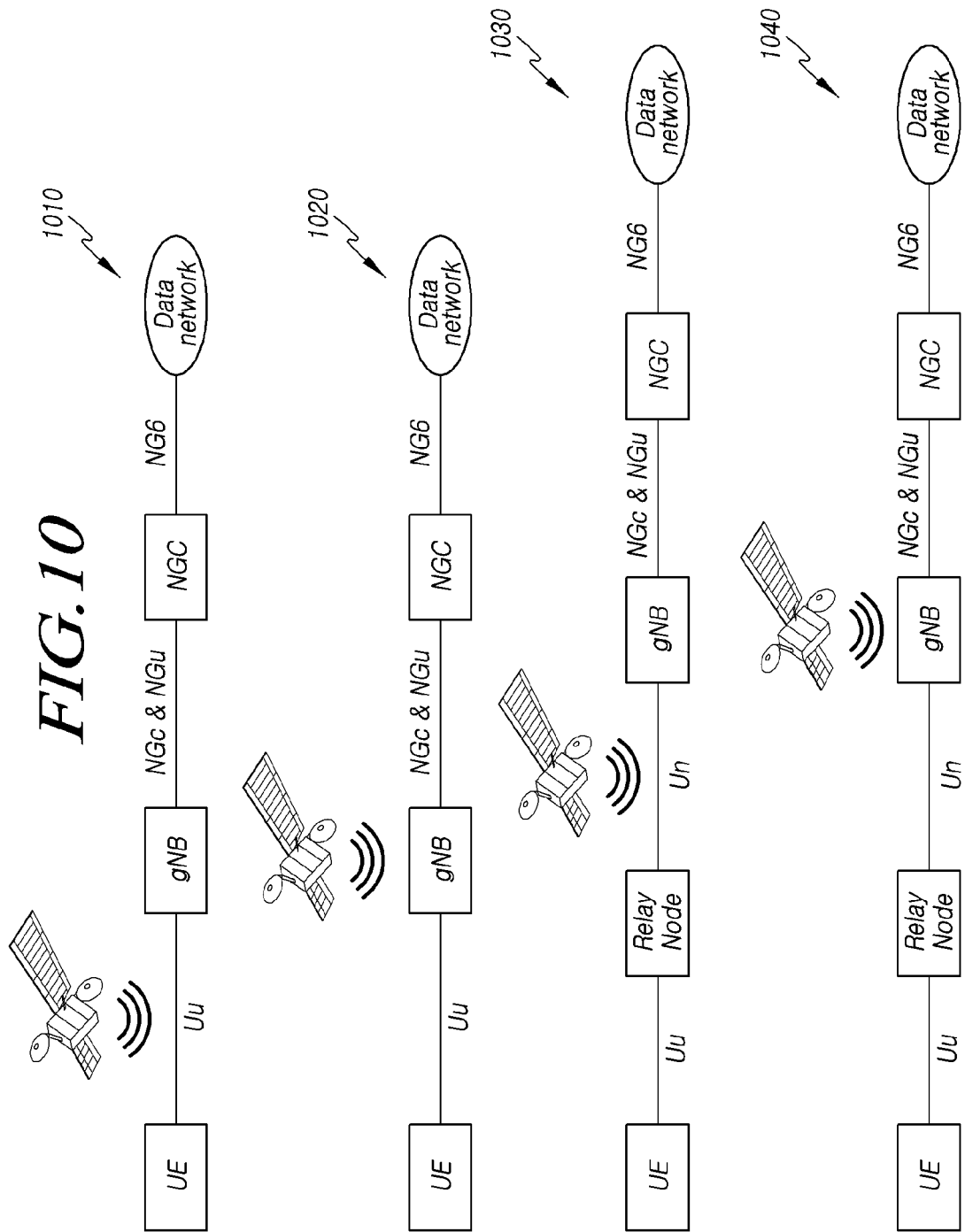
FIG. 10 is a view for explaining various forms of a non-terrestrial network structure.

FIG. 10 is a view for explaining various forms of a non-terrestrial network structure.

Referring to FIG. 10, a non-terrestrial network may be designed in a structure in which a UE performs wireless communication using an apparatus located in the sky. For example, the non-terrestrial network may be implemented in a structure in which a satellite or air transport device is located between the UE and a base station (gNB) to relay communication, such as a structure 1010. As another example, the non-terrestrial network may be implemented in a structure in which a satellite or air transport device performs some or all of the functions of the base station (gNB) to perform communication with the UE, such as a structure 1020. As another example, the non-terrestrial network may be implemented in a structure in which the satellite or the air transport device is located between a relay node and the base station (gNB) to relay communication, such as a structure 1030. As another example, the non-terrestrial network may be implemented in a structure in which the satellite or the air transport apparatus performs some or all of the functions of the base station (gNB) to perform communication with the relay node, such as a structure 1040.

Accordingly, in the present specification, a configuration for performing communication with the UE in connection with the core network is described as a network node or a base station, but this may mean the above described airborne vehicle or spaceborne vehicle. If necessary, the network node or the base station may mean the same device such as 1020 and 1040, or may be used to distinguish different devices such as 1010 and 1030 according to a non-terrestrial network structure.

That is, in the following, the network node or the base station refers to an apparatus that transmits and receives data to and from the UE in the non-terrestrial network structure, and the network node or the base station also refers to an apparatus that controls an access procedure and a data transmission/reception procedure of the UE. Accordingly, when the airborne vehicle or the spaceborne vehicle device performs some or all of the functions of the base station, the network node or the base station may mean the airborne vehicle or the spaceborne vehicle device. In contrast, when the airborne vehicle or the spaceborne vehicle plays a role of relaying a signal from a separate ground base station, the network node or the base station may mean a ground base station.

MAC procedure

The MAC protocol provides services such as mapping between logical channels and transport channels, multiplexing/demultiplexing of MAC SDUs, reporting of scheduling information, and priority processing. Such a MAC protocol controls media access through various MAC procedures. The 3GPP TS 38.321, which is an NR MAC protocol standard, discloses techniques for various MAC procedures such as random access procedure, uplink timing alignment maintenance, DL-SCH/UL-SCH data transmission, and discontinuous reception (DRX). However, the NR MAC procedure is standardized on the assumption that it operates in a short delay environment in a terrestrial network. Therefore, in the long propagation delay of the non-terrestrial network, there may be a problem in performing the existing MAC procedure.

For example, a DRX procedure for reducing power consumption of a UE may cause a problem in a long propagation delay.

FIG. 11 illustrates a DRX configuration information element according to an embodiment. Referring to FIG. 11, the definition of each parameter configured by RRC is as follows.

drx-HARQ-RTT-TimerDL (per DL HARQ process): the minimum duration before a DL assignment for HARQ retransmission is expected by the MAC entity.

drx-HARQ-RTT-TimerUL (per UL HARQ process): the minimum duration before a UL HARQ retransmission grant is expected by the MAC entity.

drx-RetransmissionTimerDL (per DL HARQ process): the maximum duration until a DL retransmission is received.

drx-RetransmissionTimerUL (per UL HARQ process): the maximum duration until a grant for UL retransmission is received.

The base station may configure the above described DRX parameter used to control PDCCH monitoring in the MAC entity of the UE in the UE through RRC signaling. When in the RRC CONNECTED, if the DRX is configured, the MAC entity of the UE may discontinuously monitor the PDCCH using the DRX operation. Otherwise, the MAC entity should continuously monitor the PDCCH.

On the other hand, in the typical NR technology, the HARQ retransmission operation is performed by instructing scheduling through the PDCCH when a NACK is transmitted in response to a HARQ reception failure. Therefore, time according to the round trip delay is consumed to process HARQ feedback and scheduling.

As shown in FIG. 11, the drx-HARQ-RTT-Timer may be configured by selecting a value between 0 and 56 symbols. 56 symbols correspond to 4 ms in the case of 15 kHz subcarrier spacing. Therefore, the drx-HARQ-RTT-Timer of the typical NR DRX procedure may not support a large round trip delay of a non-terrestrial network. In addition, the drx-RetransmissionTimer may be configured by selecting a value from 0 to 320 slots. The 320 slots correspond to 320 ms in the case of 15 kHz subcarrier spacing. However, when the subcarrier spacing increases, the duration is shortened. Therefore, the drx-RetransmissionTimer of the typical NR DRX procedure may not support a large round trip delay of the non-terrestrial network.

As described above, the typical NR MAC procedure has been standardized on the assumption that it operates in a short delay environment in the terrestrial network. Accordingly, there is a problem that the NR MAC procedure may not be performed in a propagation delay environment of the non-terrestrial network. For example, the drx-HARQ-RTT-Timer or the drx-RetransmissionTimer parameters do not support a value required for a round trip in a propagation delay environment of the non-terrestrial network, so the UE has a problem that the UE may not be able to perform the DRX procedure.

In order to solve this problem, the present disclosure introduces a technique for effectively performing an NR MAC procedure in the propagation delay environment of the non-terrestrial network. In addition, the present disclosure jprovides a technique for performing individual procedures required in a communication process, such as a random access procedure between the UE and the network node, a scheduling request procedure, a HARQ procedure, and a DRX operation, in consideration of a long delay in the non-terrestrial network.

Each of the embodiments provided below may be applied to an NR UE through an NR base station or may be applied to an LTE UE through an LTE base station. In addition, each of the embodiments provided below may be applied to an LTE UE connecting to an eLTE base station connected through a 5G system (or 5G Core Network), and an E-UTRAN NR (EN-DC) providing simultaneous LTE and NR wireless connectivity. Dual Connectivity) UE or NE-DC UE.

Figure 12:
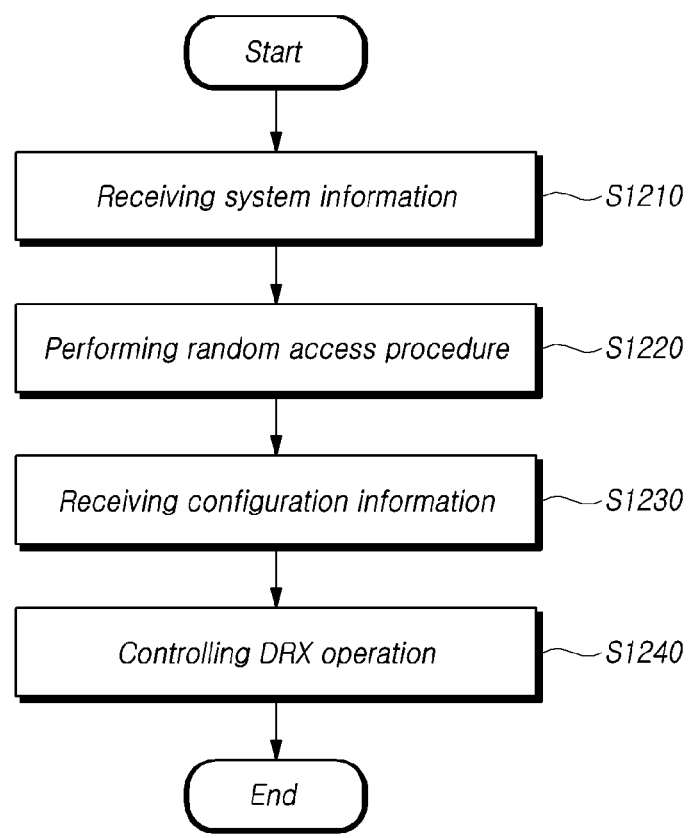
FIG. 12 is a flowchart for describing operations of a UE according to an embodiment.

FIG. 12 is a flowchart for describing operations of a UE according to an embodiment.

Referring to FIG. 12, a user equipment (UE) for performing communication using a non-terrestrial network may perform: receiving system information including reference round trip delay offset information of a non-terrestrial network cell at S1210. For example, the reference round trip delay offset information may be determined based on a signal transmission time between the UE and the network node. As another example, the reference round trip delay offset information may be determined based on a time difference at which a signal transmitted by the UE or the network node is received by the network node or the UE, respectively. As still another example, the reference round trip delay offset information may be determined based on a time difference at which a response signal for a signal transmitted from the UE is received by the UE.

The reference round trip delay offset information may be included in the system information transmitted from the network node and received by the UE. The reference round trip delay offset information may be included in the system information explicitly or implicitly.

The UE may perform a random access procedure in the non-terrestrial network cell at S1220. For example, after receiving the system information, the UE may perform the random access procedure to access a network node using the non-terrestrial network.

According to an embodiment, the UE may perform: transmitting a message 3 (MSG 3) in the case of a contention-based random access procedure, starting a timer for contention resolution when a time according to the reference round trip delay offset information elapses after transmission of the message 3 and stopping the timer when the contention resolution is complete. That is, if the time corresponding to the reference round trip delay offset elapses after the message 3 is transmitted, the UE monitors whether to receive a message 4 (MSG 4) or not. In order to determine whether contention is resolved, the UE starts a timer for contention resolution when the time corresponding to the reference round trip delay offset elapses after the message is transmitted and stops the corresponding timer when the message 4 is normally received to complete the random access procedure.

According to another embodiment, the UE may perform: transmitting a message A (MSG A) in the case of a two-step random access procedure, starting a response timer when a time according to the reference round trip delay offset information elapses after transmission of the message A and stopping the response timer when a message B, which is a response message to the message A, is received. That is, in the case of performing the two-step random access procedure including transmission of a message A and reception of a message B, the UE may transmit the message A and starts a response timer when the time corresponding to the reference round trip delay offset elapses to monitor whether to receive the message B. Thereafter, when the message B is normally received, the UE stops the response timer and completes the random access procedure.

The above described random access procedure will be described in more detail below with reference to the drawings.

The UE may perform: receiving configuration information that is necessary to perform communication by using the non-terrestrial network cell at S1230. For example, the configuration information may include a discontinuous reception HARQ RTT (drx HARQ Round Trip Time) timer or a SR (Scheduling Request) prohibition timer. The discontinuous reception HARQ RTT (drx HARQ Round Trip Time) timer or the SR (Scheduling Request) prohibition timer may be also configured to a value greater than the reference round trip delay offset.

The UE may perform: controlling a discontinuous reception (DRX) operation based on the configuration information at S1240. For example, the UE may perform the DRX operation using a timer and the like included in the system information.

According to an embodiment, the UE performs the DRX operation using a HARQ RTT (drx HARQ Round Trip Time) timer. The UE may make the discontinuous reception HARQ RTT (drx HARQ Round Trip Time) timer disabled when a disable indication for a HARQ feedback operation is received. That is, when the network node indicate to disable the HARQ feedback operation, the UE disables the discontinuous reception HARQ RTT (drx HARQ Round Trip Time) timer and does not perform the HARQ feedback operation.

According to another embodiment, the UE may perform a scheduling request operation based on a scheduling request (SR) prohibition timer.

In this way, the UE may use the reference round trip delay offset information received from the base station in the MAC procedure to reflect an increase in the delay time according to the non-terrestrial network.

Hereinafter, the operation of the UE in the random access procedure briefly described above will be described in more detail with reference to the drawings.

Figure 13:
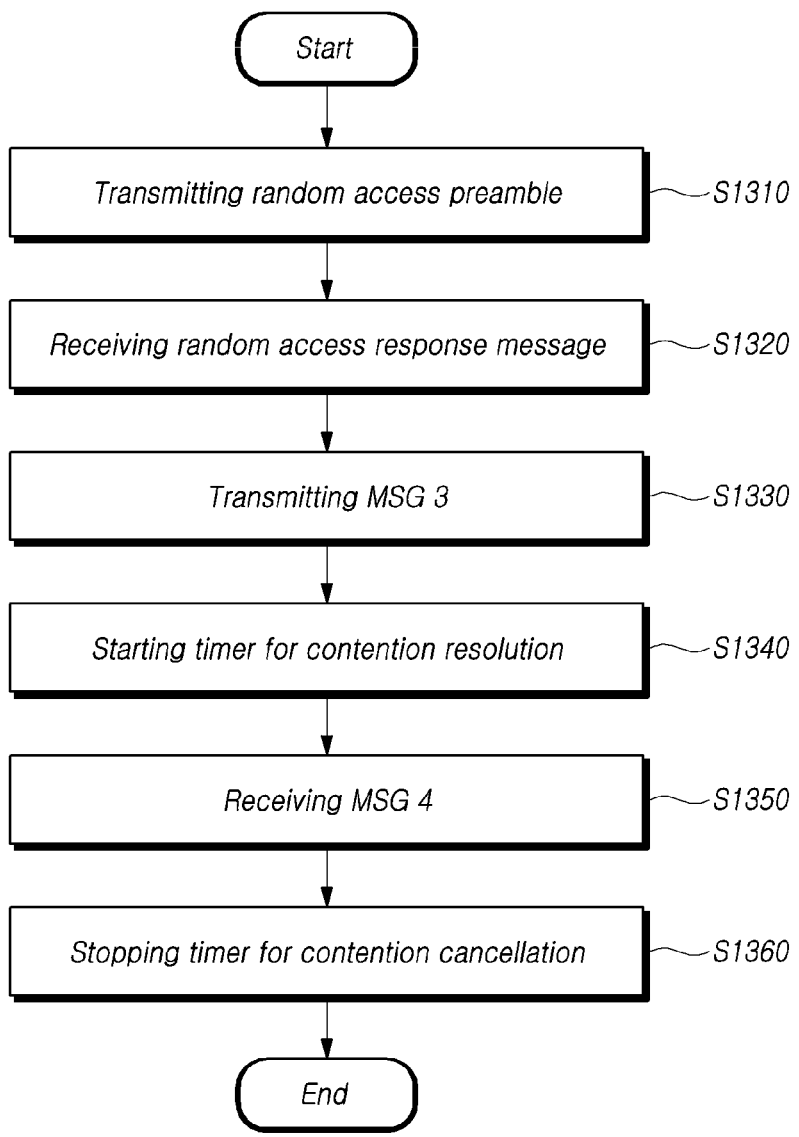
FIG. 13 is a flowchart for describing a contention-based random access operation of a UE according to an embodiment.

FIG. 13 is a flowchart for describing a contention-based random access operation of a UE according to an embodiment.

Referring to FIG. 13, the UE transmits a random access preamble to access a non-terrestrial network cell at S1310. For example, the UE may select and transmit one of a predetermined number of preambles using the PRACH.

The UE receives a random access response message including response information for the random access preamble at S1320. For example, the UE monitors whether or not the random access response message is received within a random access response window configured based on the random access preamble transmission resource information. If the random access response message identified by a temporary identifier related to random access preamble transmission is received within the random access response window, the UE receives the random access response message.

Thereafter, the UE transmits a message 3 (MSG 3) including request information for requesting an RRC connection at S1330. For example, the MSG 3 may include information requesting allocation of radio resources required for uplink transmission.

When a predetermined period elapses after the MSG 3 is transmitted, the UE accessing the aforementioned non-terrestrial network cell starts a timer for contention resolution at S1340. For example, the predetermined period may be determined based on the reference round trip delay offset information received through the system information. That is, when the MSG 3 is transmitted, the UE starts the timer for the contention resolution after a certain period determined according to the reference round trip delay offset has elapsed. Here, the timer for the contention resolution may be configured in advance in the UE or may be received through a separate message.

While the timer for the contention resolution is running, the UE receives a message 4 (MSG 4) including information for the contention resolution at S1350. When the MSG 4 is received and the UE is connected to the non-terrestrial network cell, the UE stops the timer for the contention cancellation at S1360.

Through this, the UE may prevent the occurrence of a random access procedure failure due to the expiry of the contention resolution timer even though the MSG 4 has been transmitted by operating the timer for the contention resolution in consideration of a long round trip delay occurring in a non-terrestrial network environment.

Figure 14:
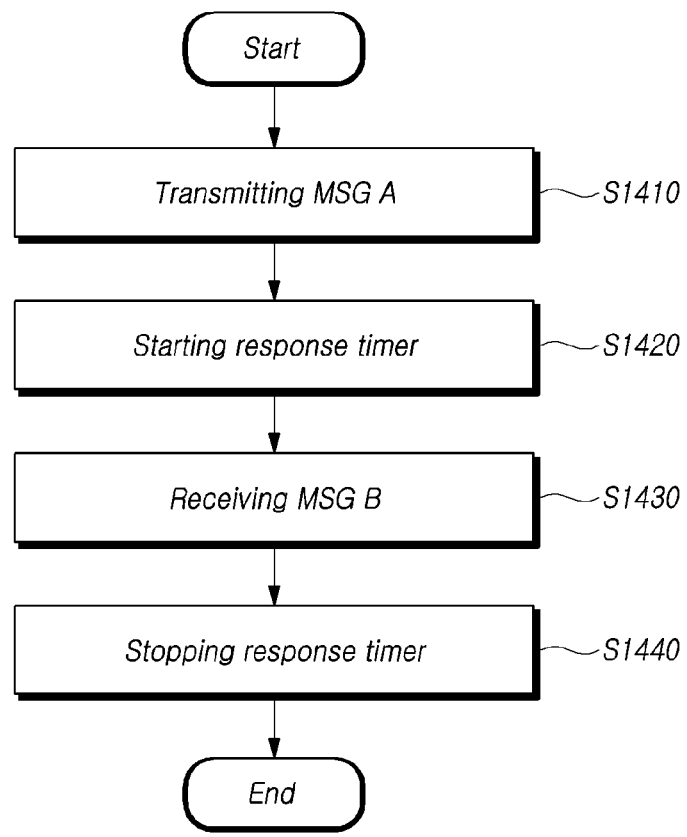
FIG. 14 is a flowchart for explaining a two-step random access operation of a UE according to an embodiment.

FIG. 14 is a flowchart for explaining a two-step random access operation of a UE according to an embodiment.

Referring to FIG. 14, even in a two-step random access process, the UE may prevent detection of a random access failure due to expiry of a response timer by determining a timer start time using the reference round trip delay offset information.

The two-step random access procedure is a technology for supporting a fast random access procedure by simplifying the general four-step random access procedure of random access preamble transmission, random access response reception, MSG 3 transmission, and MSG 4 reception described in FIG. 13 into two steps.

For example, the UE simultaneously transmits the random access preamble and the MSG A including the MSG 3 at S1410. The random access preamble is transmitted through the PRACH, and the MSG 3 is transmitted through the PUSCH.

After the MSG A is transmitted, the UE starts a response timer after a predetermined delay time determined based on the reference round trip delay offset information at S1420. For example, the UE starts the response timer after the time included in the reference round trip delay offset information has elapsed.

The UE monitors whether the MSG B is received while the response timer is running, and receives the MSG B at S1430. For example, the MSG B includes some or all of the random access response message and MSG 4 information in FIG. 13.

When the MSG B is received, the UE stops the response timer and ends the random access procedure at S1440.

In this way, even in the random access procedure, it is possible to prevent an unexpected random access failure situation from occurring in consideration of a long round trip delay according to a non-terrestrial network configuration.

Hereinafter, the operation of the base station corresponding to the operation of the UE described above will be described. The part associated with the operation of the UE in the operation of the base station is described above, and such a part may be omitted to avoid unnecessary duplication.

Figure 15:
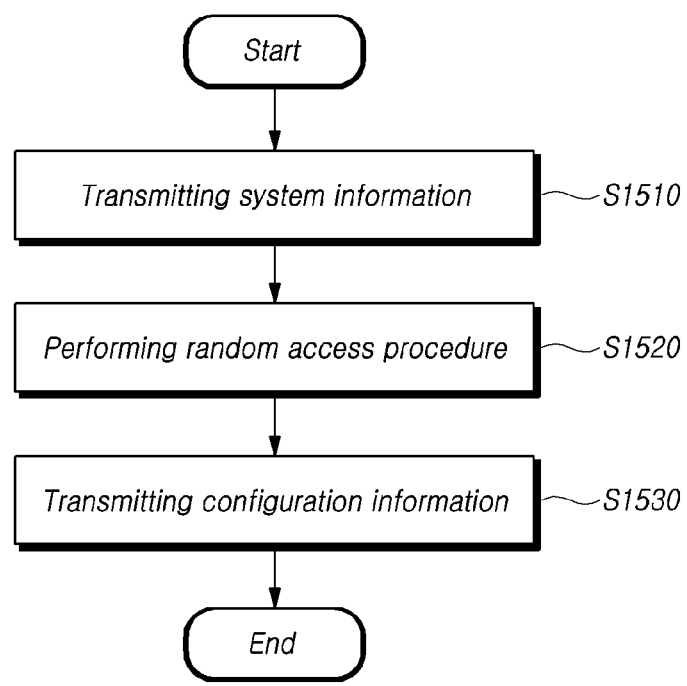
FIG. 15 is a flowchart for describing operations of a network node according to an embodiment.

FIG. 15 is a flowchart for describing operations of a network node according to an embodiment.

Referring to FIG. 15, a network node performing communication using a non-terrestrial network with a user equipment (UE) may perform: transmitting system information comprising reference round trip delay offset information of a non-terrestrial network cell at S1510. For example, the reference round trip delay offset information may be determined based on a signal transmission time between the UE and the network node. According to an embodiment, the reference round trip delay offset information may be determined based on a time difference at which a signal trans- mitted by the UE or the network node is received by the network node or the UE, respectively. According to another embodiment, the reference round trip delay offset information may be determined based on a time difference at which a response signal for a signal transmitted from the UE is received by the UE. The reference round trip delay offset information may be included in the system information explicitly or implicitly.

The network node may perform: performing a random access procedure with the UE in the non-terrestrial network cell at S1520. For example, the network node may perform the random access procedure with the UE accessing the network node using the non-terrestrial network.

According to an embodiment, the network node receives a message 3 (MSG 3) from the UE in the case of a contention-based random access procedure. The UE starts a timer for contention resolution when a time according to the reference round trip delay offset information elapses after transmission of the message 3. The network node may receive a message 4(MSG 4) including a response information for the message 3. The UE stops the corresponding timer when the message 4 is normally received to complete the random access procedure. That is, if the time corresponding to the reference round trip delay offset elapses after message 3 is transmitted, the UE monitors whether to receive a message 4 or not.

According to another embodiment, the network node receives a message A (MSG A) in the case of a two-step random access procedure. The UE starts a response timer when a time according to the reference round trip delay offset information elapses after transmission of the message A. The network node transmits a message B, which is a response message to the message A to the UE. When the UE receives the message B, it stops the response timer. That is, in the case of performing the two-step random access procedure consisting of transmission of a message A and reception of a message B, the UE may transmit the message A and starts a response timer when the time corresponding to the reference round trip delay offset elapses to monitor whether to receive the message B. Thereafter, when the message B is normally received, the UE stops the response timer and completes the random access procedure.

The network node may perform: transmitting configuration information that is necessary to perform communication by using the non-terrestrial network cell at S1530. For example, the configuration information may include a discontinuous reception HARQ RTT (drx HARQ Round Trip Time) timer or a SR (Scheduling Request) prohibition timer. The discontinuous reception HARQ RTT (drx HARQ Round Trip Time) timer or the SR (Scheduling Request) prohibition timer may be also configured to a value greater than the reference round trip delay offset.

The network node may transmit indication information disabling a HARQ feedback operation to the UE. The UE makes the discontinuous reception HARQ RTT (drx HARQ Round Trip Time) timer disabled when the indication information is received. As an example, the UE performs the DRX operation based on a HARQ RTT (drx HARQ Round Trip Time) timer. The UE may make the discontinuous reception HARQ RTT (drx HARQ Round Trip Time) timer disabled when a disable indication for a HARQ feedback operation is received. That is, when the network node indicates to disable the HARQ feedback operation, the UE disables the discontinuous reception HARQ RDD (drx HARQ Round Trip Time) timer and does not perform the HARQ feedback operation. As another example, the UE may perform a scheduling request operation based on a scheduling request (SR) prohibition timer.

In this way, the UE may use the reference round trip delay offset information received from the base station in the MAC procedure to reflect an increase in the delay time according to the non-terrestrial network.

Hereinafter, detailed embodiments for performing an operation in consideration of a long round trip delay between the UE and the base station in the above described non-terrestrial network situation will be described in detail. Each of the embodiments provided below may be implemented individually or in any combination.

For convenience of explanation, the following describes a timer processing method and a random access procedure in consideration of the long round trip delay of the NTN in the DRX procedure. This is for convenience of description, and the embodiments described below may be applied to the timer processing on a MAC procedure. In addition, in the following description, for convenience of understanding, it is expressed as the base station.

First Embodiment: A Method of Designating a Specific Value of an Existing Parameter and Linking it to a New Parameter for Indicating a Long Round Trip Delay Offset Value In order to consider the long propagation delay situation of the non-terrestrial network, a value applied to the parameter used in the MAC procedure may be configured to be distinguished from the terrestrial network.

For example, in order to consider a large propagation delay of the non-terrestrial network, a value applied to a parameter included in the DRX configuration information element may be configured with a large value. For example, a value that may be assigned to drx-HARQ-RTT-Timer or drx-Retransmission Timer included in the configuration information may be controlled to be configured as a value that exceeds the round trip delay of the non-terrestrial network. To this end, a configurable value for each parameter may be changed/added, or a specific value may be designated to indicate the associated parameter. For a UE capable of communication using a non-terrestrial network (NTN capable UE), a parameter value configured with a value exceeding the round trip delay may be used.

As an example, the base station configures the drx-HARQ-RTT-Timer value from the existing 0 to 56 symbols according to the type of non-terrestrial network (e.g., LEO satellite, MEO satellite, GEO satellite, HAPs, etc.). It may be added by selecting a round trip delay offset value. A UE capable of non-terrestrial network communication (a UE having NTN capabilities) may perform a DRX operation through the added value. When considering the long round trip delay of the satellite, a value added to the 0 to 56 symbols may be a unit other than the symbol unit (eg, slot or millisecond). For example, it is assumed that a round trip delay between a UE at a cell/beam center point and a satellite is 24 ms within coverage by an NTN cell or an NTN beam provided by that satellite for a specific LEO satellite. The round trip delay may vary depending on the location of the UE and the location of the satellite. Therefore, the round trip delay between the UE at the cell/beam center point and the satellite within the coverage by the NTN cell/beam provided by the above described satellite is defined as a reference round trip delay. For convenience of explanation, it is hereinafter referred to as a reference round trip delay. The base station may configure the drx-HARQ-RTT-Timer to select an integer value among INTEGERs (reference round trip delay . . . reference round trip delay+56). Here, the round trip delay may be a value converted in units of slots. Accordingly, the drx-HARQ-RTT-Timer value may be selected and indicated among integer values between the reference round trip delay value and the reference round trip delay plus 56 slots. Alternatively, for this purpose, the base station may indicate the reference round trip delay to the UE through a separate information element. In this case, the UE indicates the drx-HARQ-RTT-Timer parameter as an integer value between 0 and 56 slots as in the related art, and the sum of it and the reference round trip delay for the NTN capable UE mays be used as the value of the drx-HARQ-RTT-Timer.

As another example, the base station codes the drx-HARQ-RTT-Timer value from the existing 0-56 symbols to a typical round trip delay value according to the type of non-terrestrial network (e.g., LEO satellite, MEO satellite, GEO satellite, HAPs, etc.). The base station may select one of the coded values and replace the 0-56 symbol value with the selected value. The UE capable of non-terrestrial network communication may perform the DRX operation through the replaced value. The corresponding value may be coded based on the selected value through a unit other than a symbol unit (e.g., slot or ms). The base station supporting the non-terrestrial network may indicate the corresponding value to the UE through the system information or explicit signaling through dedicated RRC signaling. Alternatively, the UE may be configured to use the corresponding value implicitly according to other indication information or pre-configuration by the base station supporting the non-terrestrial network.

As another specific example, the base station may indicate that a parameter to be used as the drx-HARQ-RTT-Timer for NTN exists by designating a specific value (eg, 0) among the conventional drx-HARQ-RTT-Timer values. In the case of the UE capable of non-terrestrial network communication, when the drx-HARQ-RTT-Timer is indicated as the corresponding value (for example, 0), a parameter value indicated by information (Information element) distinguished from the drx-HARQ-RTT-Timer may be used as the HARQ-RTT-Timer. A parameter distinguished from the drx-HARQ-RTT-Timer to be used as the HARQ-RTT-Timer may be indicated by the system information or RACH-common information (RACH-configcommon). Alternatively, a parameter distinguished from the drx-HARQ-RTT-Timer to be used as the HARQ-RTT-Timer may be indicated to be used in connection with each drx parameter in drx-config. Alternatively, the parameter value distinguished from the drx-HARQ-RTT-Timer to be used as the HARQ-RTT-Timer may be calculated in the UE by separate information explicitly or implicitly indicated by the base station. The parameter distinguished from the drx-HARQ-RTT-Timer to be used as the HARQ-RTT-Timer may be provided as a time value such as one way delay or RTD between the UE and the base station, and the parameter is coded according to the location or height information of the base station. This parameter may also be provided as a value used to recognize/calculate the reference round trip delay.

As another example, the base station configures the drx-RetransmissionTimer value to a value in consideration of the typical round trip delay values according to the type of non-terrestrial network (e.g., LEO satellite, MEO satellite, GEO satellite, HAPs, etc.) and adds it to a spare value. Alternatively, the drx-HARQ-RTT-Timer of the above described embodiments may be applied to the drx-Retransmission Timer in the same form. Alternatively, the drx-HARQ-RTT-Timer is configured as a separate value for the non-terrestrial network according to the above described embodiments, but in order to reduce the PDCCH monitoring time of the UE, the drx-RetransmissionTimer value may be applied to the same range as a parameter value of the conventional NR used in the terrestrial network situation.

As described above, the non-terrestrial network may have various types according to the types of network nodes such as GEO, MEO, LEO, and HAPS and the like, and the altitude of satellites within each type may be operated differently. Meanwhile, the DRX parameter in the current NR RRC standard is configured to a value within a predetermined range and is standardized. In order to consider the various round trip delays of the NTN, the drx-HARQ-RTT-Timer parameter value described above may be indicated to the UE with a range set of different DRX parameters for each NTN type/satellite altitude/round trip delay. Alternatively, the drx-HARQ-RTT-Timer parameter value may have a range of one DRX parameter, and the drx-HARQ-RTT-Timer parameter value may be indicated to apply in connection with it through a reference round trip delay. Alternatively, the drx-HARQ-RTT-Timer parameter value may be indicated through a specific value of an existing parameter.

Second Embodiment: A Method of Indicating Offset Information for a Non-Terrestrial Network to a UE and Overriding or Adding the Offset Information Value to the Corresponding Timer Value The offset information may be configured to take into account a large propagation delay of the non-terrestrial network. In addition, the offset information may be added/subtracted/calculated to a drx timer value, or the corresponding offset information may be replaced with a drx timer value. For convenience of explanation, this is indicated as a round trip delay offset or NTN RTD offset. This is for convenience of description and may be replaced with any other name and may mean the reference round trip delay described above.

For example, when a UE capable of non-terrestrial network communication receives NTN RTD offset information (or information for calculating NTN RTD offset), the UE controls the running of drx-HARQ-RTT-Timer so that a value adding the NTN RTD offset to the drx-HARQ-RTT-Timer value indicated through the DRX configuration information becomes the drx-HARQ-RTT-Timer value. Alternatively, when the UE capable of the non-terrestrial network communication receives the NTN RTD offset information (or information for indicating the NTN RTD offset), the UE may ignore the value configured in the drx-HARQ-RTT-Timer (or the drx-Retransmission Timer) and control the running of the drx-HARQ-RTT-Timer (or the drx-Retransmission Timer) so that the NTN RTD offset becomes the drx-HARQ-RTT-Timer value.

As an example, when the NTN RTD offset is configured as 544 ms and the drx-HARQ-RTT-Timer value is configured as 56 symbols (4 ms assuming the use of 15 kHz subcarrier spacing), the UE expire the drx-HARQ-RTT-Timer at 548 ms (544 ms+4 ms).

As another example, when the NTN RTD offset is configured as 544 ms and the drx-HARQ-RTT-Timer value is configured as 56 symbols (4 ms assuming the use of 15 kHz subcarrier spacing), the UE may ignore the indicated drx-HARQ-RTT-Timer value (4 ms) and apply the value indicated/calculated by the NTN RTD offset (544 ms) to the drx-HARQ-RTT-Timer value. For example, if the NTN RTD offset is indicated (or the NTN RTD offset is calculated according to the indication information), the UE may use the corresponding value (544 ms) as the drx-HARQ-RTT-Timer value.

As another example, even if the NTN RTD offset is configured as 544 ms, the drx-Retransmission Timer may use a value indicated as drx-RetransmissionTimer through the DRX configuration information. For example, the UE configured with the drx-RetransmissionTimer value of 8 slots (8 ms, assuming that 15 kHz subcarrier spacing is used) starts a corresponding timer and may expire the drx-RetransmissionTimer at 8 ms. In this case, the drx-HARQ-RTT-Timer value may be changed by applying the NTN RTD offset according to the specific embodiment described above.

As another example, when the NTN RTD offset is configured as 544 ms, the UE for which the drx-RetransmissionTimer value is 8 slots (8 ms if 15 kHz subcarrier spacing is used) expires the drx-RetransmissionTimer at 544 ms+8 ms.

The operation on the side of the MAC entity may be performed in the following procedure.

For example, when the DRX is configured, the MAC entity shall:

If a MAC PDU is transmitted in a configured uplink grant:
  start the drx-HARQ-RTT-TimerUL for the corresponding HARQ process in the first symbol after the end of the first repetition of the corresponding PUSCH transmission;
  stop the drx-RetransmissionTimerUL for the corresponding HARQ process.
If a drx-HARQ-RTT-TimerDL expires:
If the data of the corresponding HARQ process has not been successfully decoded:
  starts the drx-RetransmissionTimerDL for the corresponding HARQ process in the first symbol after the expiry of the drx-HARQ-RTT-TimerDL.
If one drx-HARQ-RTT-TimerUL expires:
  start the drx-RetransmissionTimerUL for the corresponding HARQ process in the first symbol after the expiry of drx-HARQ-RTT-TimerUL.
If the MAC entity is in active time:
  monitor the PDCCH.
If the PDCCH indicates one DL transmission, or if one DL allocation is configured:
  start the drx-HARQ-RTT-TimerDL for the HARQ process corresponding to the first symbol after the end of the corresponding PUCCH transmission;
  stop the drx-RetransmissionTimerDL for the corresponding HARQ process.
If the PDCCH indicates one UL transmission:
  stars the drx-HARQ-RTT-TimerUL for the corresponding HARQ process in the first symbol after the end of the first repetition of the corresponding PUSCH transmission;
  stop drx-RetransmissionTimerUL for the corresponding HARQ process.

Meanwhile, when one DRX cycle is configured, the active time for a UE capable of the non-terrestrial network communication includes one or more of the following.

Active time when the drx-RetransmissionTimerUL is active and the drx-RetransmissionTimerUL is greater than (or equal to or greater than) the NTN RTD offset.

Active time when the drx-RetransmissionTimerDL is active and the drx-RetransmissionTimerDL is greater than (or equal to or greater than) the NTN RTD offset.

Active time when ra-ContentionResolutionTimer is active and the ra-ContentionResolutionTimer is greater than (or equal to or greater than) the NTN RTD offset.

Active time when one scheduling request is transmitted on the PUCCH and then the NTN RTD offset has elapsed, it is pending, or if sr-ProhibitTimer to prohibit the duplicate scheduling requests is configured and used, one scheduling request is transmitted on the PUCCH, the sr-ProhibitTimer is greater than (or greater than or equal to) the NTN RTD offset and it is pending.

Active time when the NTN RTD offset has elapsed after successful reception of one random access response for a random access preamble not selected by the MAC entity among contention-based random access preambles and the PDCCH indicating a new transmission addressed to the C-RNTI of the MAC entity is not successfully received.

DRX is configured, and if the MAC entity is in the aforementioned active time, the MAC entity monitors the PDCCH.

Accordingly, the UE may reduce power consumption by monitoring the PDCCH after the round trip delay without immediately monitoring the PDCCH after sending the scheduling request.

The offset information described above or the offset timer to be described hereinafter may be indicated by system information or RACH common information (RACH-config-common). Alternatively, the offset information or the offset timer to be described hereinafter may be indicated in drx-config in association with each drx parameter. Alternatively, the offset information or the offset timer to be described hereinafter may be explicitly indicated by a signal by the base station. Alternatively, the offset information or the offset timer to be described hereinafter may be calculated by the UE capable of the non-terrestrial network communication through explicitly indicated information and pre-configured information. The offset information or the offset timer to be described hereinafter may be provided as a time value such as one way delay or RTD between the UE and the base station, or may be coded according to the location or height information of the base station and provided as a value capable of recognizing/calculating the RTD. Alternatively, the information indicated by the base station includes information (e.g., index value TA) used to control the amount of timing adjustment in the MAC entity, and the offset information or the offset timer to be described hereinafter may be calculated through calculation of the indicated information.

Third Embodiment: A Method of Indicating a New Offset Timer Distinct from an Existing Timer A new timer for taking into account a large propagation delay of a non-terrestrial network may be defined and configured in the UE. For convenience of explanation, the new timer is referred to as an offset timer, but in order to effectively support non-terrestrial network communication of the UE, it may be replaced with any name as indicating a new timer separately added to the existing MAC procedure. For example, when a UE capable of the non-terrestrial network communication receives the offset timer (or information for calculating the offset timer), a corresponding timer may be started and expired, and then the drx-HARQ-RTT-Timer or the drx-Retransmission Timer may be started. As another example, when the drx-HARQ-RTT-Timer or the drx-RetransmissionTimer expires, the offset timer may be started.

For example, when the offset timer is configured as 544 ms and the drx-HARQ-RTT-Timer is configured as 56 symbols (4 ms assuming that 15 kHz subcarrier spacing is used), the UE starts the first offset timer at a time when it starts the drx-HARQ-RTT-Timer in the related art. When the first offset timer expires after 544 ms, the UE starts drx-HARQ-RTT-Timer. Through this, the UE may start the drx-HARQ-RTT-Timer in consideration of the offset round trip delay in a non-terrestrial network situation.

As another example, when the offset timer is configured as 544 ms and the drx-HARQ-RTT-Timer is configured as 56 symbols (4 ms assuming that 15 kHz subcarrier spacing is used), the UE may ignore the indicated drx-HARQ-RTT-Timer value (4 ms), and override the value indicated/calculated by the NTN RTD offset (544 ms) to the drx-HARQ-RTT-Timer value so that the former may be used as the later. For example, if an NTN RTD offset is indicated (or an NTN RTD offset is calculated according to the indication information), the corresponding value (544 ms) may be used as the drx-HARQ-RTT-Timer value. In this case, since the offset timer value is reflected in the drx-HARQ-RTT-Timer value, the operation of the drx-HARQ-RTT-Timer may be applied in the same manner as a typical method using the terrestrial network.

As another example, regardless of the offset timer configured as 544 ms, the drx-Retransmission Timer may be operated by a value indicated in the drx-Retransmission-Timer. For example, if the drx-RetransmissionTimer value is configured with 8 slots (8 ms if 15 kHz subcarrier spacing is used), the UE starts the drx-Retransmission Timer and may expire the drx-Retransmission Timer at 8 ms.

As another example, when the offset timer is configured as 544 ms and the drx-RetransmissionTimer value is configured as 8 slots (8 ms assuming the use of 15 kHz subcarrier spacing), the UE starts the second offset timer when the drx-RetransmissionTimer in the related art is started. The UE starts the drx-Retransmission Timer when the second offset timer expires after 544 ms.

The operation of the MAC entity may be performed in the following procedure.

When the DRX is configured, the MAC entity shall:
If a MAC PDU is received in a configured downlink assignment:
 starts an offset timer for the corresponding HARQ process in the first symbol after the corresponding transmission carrying DL HARQ feedback is ended.
 stop the drx-RetransmissionTimerDL for the corresponding HARQ process.
If the offset timer expires:
 start the drx-HARQ-RTT-TimerDL for the corresponding HARQ process;
 stop the drx-RetransmissionTimerDL for the corresponding HARQ process.
If a drx-HARQ-RTT-TimerDL expires:
If the data of the corresponding HARQ process has not been successfully decoded:
 start the offset timer for the corresponding HARQ process in the first symbol after expiry of the drx-HARQ-RTT-TimerDL is started.
If the offset timer expires:
 start the drx-RetransmissionTimerDL for the corresponding HARQ process.
(Or, if the drx-HARQ-RTT-TimerDL expires:
If the data of the corresponding HARQ process has not been successfully decoded:

start the drx-RetransmissionTimerDL for the HARQ process corresponding to the first symbol after the expiry of the drx-HARQ-RTT-TimerDL.
If the drx-HARQ-RTT-TimerUL expires:
start the offset timer for the corresponding HARQ process in the first symbol after expiry of the drx-HARQ-RTT-TimerUL.
If the offset timer expires:
start the drx-RetransmissionTimerUL for the corresponding HARQ process.
(Or, if the drx-HARQ-RTT-TimerUL expires:
start the drx-RetransmissionTimerUL for the HARQ process for the corresponding HARQ process in the first symbol after the expiry of the drx-HARQ-RTT-TimerUL.)
If the MAC entity is in active time:
monitor the PDCCH.
If the PDCCH indicates one DL transmission (or if one DL allocation is configured):
start or restart, the offset timer for the corresponding HARQ process in the first symbol after the end of the corresponding PUCCH transmission (DL HARQ feedback).
stop the drx-RetransmissionTimerDL for the corresponding HARQ process.
When the offset timer expires
start the drx-HARQ-RTT-TimerDL for the corresponding HARQ process;
stop the drx-RetransmissionTimerDL for the corresponding HARQ process.
If the PDCCH indicates one UL transmission:
start the offset timer for the corresponding HARQ process in the first symbol after the end of the first repetition of the corresponding PUSCH transmission;
When the offset timer expires
start the drx-HARQ-RTT-TimerUL for the corresponding HARQ process.
As another example, the operation of the MAC entity may be performed in the following procedure.
As another example, when the DRX is configured, the MAC entity shall:
If a MAC PDU is received in a configured downlink assignment:
start the drx-HARQ-RTT-TimerDL for the corresponding HARQ process in the first symbol after the specified offset time elapses from the end of the transmission carrying the DL HARQ feedback.
stop the drx-RetransmissionTimerDL for the corresponding HARQ process.
If the MAC entity is in active time:
monitors the PDCCH.
If the PDCCH indicates one DL transmission (or if one DL allocation is configured):
start or restart the drx-HARQ-RTT-TimerDL for the corresponding HARQ process in the first symbol after the specified offset time elapses from the end of the transmission carrying the DL HARQ feedback.

The operation of DRX parameters such as the HARQ-RTT Timer and the drx-Retransmission Timer according to the embodiments has been described based on a general situation in which the HARQ process operates. However, due to the long distance between the UE and the network node in the non-terrestrial network situation, if the NR HARQ procedure is provided as it is in the NTN, a packet may be delayed (HARQ stalling) in an error correction process through the HARQ. For example, when the HARQ operation is performed through 16 parallel HARQ processes provided by the NR, the packet may be delayed (HARQ stalling) in the error correction process through the HARQ. In addition, it is difficult to increase the number of HARQ processes because an additional cost is required for the UE to increase the number of HARQ processes.

In order to solve this problem, it is possible to disable the HARQ operation (e.g., HARQ feedback for downlink reception) for each HARQ process while maintaining the number of HARQ processes. For convenience of description, such a disable operation is indicated as HARQ feedback disable. This is only for convenience of description and may be replaced with a name indicating a form in which the HARQ is not operated, such as HARQ disable, HARQ deactivation, no Uplink HARQ feedback, and HARQ feedback disable in the UE for downlink transmission.

The aforementioned drx-HARQ-RTT-Timer is started when the UE transmits HARQ NACK feedback to the base station. While the drx-HARQ-RTT-Timer is running, the UE does not expect to receive a downlink assignment or an uplink grant for a corresponding HARQ process. If the HARQ feedback is disabled, the drx-HARQ-RTT-Timer may also be disabled for the corresponding HARQ process. In this case, since the drx-HARQ-RTT-Timer is not started for the corresponding HARQ process, the UE also does not start the drx-Retransmission Timer for the corresponding HARQ process.

Meanwhile, even when the HARQ feedback is disabled, the base station may perform blind repetition transmission in order to increase the reliability of transmission. For example, the base station may perform multiple transmissions of the same TB (Transport Block) in bundles (e.g. MAC schedules packets in a bundle with pdsch-AggregationFactor>1 in down link). In addition, the UE may soft-combine the multiple transmissions of the same TB as a bundle. As another example, the base station may perform multiple transmissions of the same TB (Transport Block) (e.g. MAC schedules the same TB on the same HARQ process without NDI being toggled). In addition, the UE may soft-combine the multiple transmissions of the same TB.

If the base station wants to lower the BLER through (blind) repetition transmission, the UE and the base station may perform PDCCH monitoring by aligning the expected time for the repetition transmission to reduce power consumption.

To this end, when the HARQ feedback is disabled, the base station may indicate or transmit information for the repetition transmission to the UE. Alternatively, when the HARQ feedback is disabled, the UE may expect the repetition transmission by monitoring the PDCCH using the existing DRX parameter.

As an example, the UE may monitor the PDCCH during the expected time for the repetition transmission using the drx-Retransmission Timer parameter. For example, if the HARQ feedback is disabled, if the PDCCH indicates downlink transmission, and if the data of the corresponding HARQ process is not successfully decoded, the UE (MAC entity) starts drx-RetransmissionTimer.

As another example, a new DRX parameter defining a maximum duration until the repetition transmission is received is defined, so that the UE may monitor the PDCCH during a time when the repetition transmission is expected. When the DRX cycle is configured, the UE may be included in the active time while the timer according to the newly defined DRX parameter is running. For example, if the HARQ feedback is disabled, if the PDCCH indicates downlink transmission, and if data of a corresponding HARQ process has not been successfully decoded, the UE (MAC entity) starts the corresponding timer.

On the other hand, when the HARQ feedback is disabled, the base station may always transmit data by indicating new transmission through the PDCCH unless the blind repetition transmission is performed. In this case, the UE (the MAC entity of the UE) starts or restarts the DRX-Inactivity Timer in the first symbol after the PDCCH reception is terminated. Or, even in the case of the repetition transmission other than new transmission, if the PDCCH indicates downlink (or uplink) transmission, the UE starts or restarts the DRX-InactivityTimer. Or even in the case of the repetition transmission other than the new transmission, if the PDCCH indicates downlink (or uplink) transmission, and the data of the corresponding HARQ process is not successfully decoded, the UE starts or restarts the DRX-Inactivity Timer (drx-InactivityTimer). The base station may monitor the PDCCH in time for the blind repetition transmission with the UE by setting and indicating the DRX inactivity timer to a value other than 0.

Alternatively, it may not be desirable in terms of power consumption to allow the UE to always expect the repetition transmission and monitor the PDCCH. Therefore, if the base station performs the repetition transmission to disable the HARQ feedback of the UE and lower the BLER, the base station may transmit indication information for indicating the UE to perform an operation according to this. For example, the indication information may be provided through the RRC signaling. As another example, the indication information may be provided through the MAC CE signaling. As still another example, the indication information may be provided through the DCI. The aforementioned RRC signaling, the MAC CE signaling, or the DCI may additionally include at least one of information indicating an activation/deactivation state of an HARQ process ID and repetition transmission.

In addition, the UE may transmit help information to the base station to help determine the number of repetitions of the base station. The help information may include at least one of information on the HARQ reception failure rate and the number of repetition transmissions requested.

Embodiment of Application to Other MAC Procedures

As described above, each of the above described embodiments may be applied to any MAC procedure such as the random access procedure as well as the HARQ operation. In more detail, the random access procedure or the scheduling request procedure among MAC procedures will be exemplarily described below.

The random access procedure may be a contention based random access procedure as described in FIG. 6. The four step procedure is performed with the MSG1 for the random access preamble transmission of the UE, the MSG2 for the random access response transmission (RAR) by the base station, the MSG 3 for the transmission according to the uplink grant included in the RAR, and the MSG 4 for the contention resolution.

In contention based random access, the following parameters are defined.

ra-ResponseWindow: the time window to monitor RA response(s) (SpCell only))
ra-ContentionResolutionTimer: Timer for contention resolution (the Contention Resolution Timer (SpCell only))

When the random access preamble is transmitted, the MAC entity operates as follows.

From the end of random access preamble transmission, the ra-ResponseWindow configured in RACH-ConfigCommon is started on the first PDCCH occasion specified in TS 38.213 of 3GPP standard document.

While the ra-ResponseWindow is running, it monitors the SpCell's PDCCH for a random access response identified by RA-RNTI.

If the ra-Response Window configured in RACH-Config-Common expires, and if the random access response containing Random Access Preamble identifiers that matches the transmitted PREAMBLE INDEX has not been received; or If the ra-Response Window configured in BeamFailureRecoveryConfig expires and the PDCCH addressed to the C-RNTI has not been received, it is considered that the random access response reception was not successful. The MAC entity increases PREAMBLE TRANSMISSION COUNTER by 1.

When the MSG 3 is transmitted, the MAC entity operates as follows.

The MAC entity starts the ra-ContentionResolutionTimer (the MAC entity starts the ra-ContentionResolutionTimer and restarts the ra-ContentionResolutionTimer at each HARQ retransmission in the first symbol after the end of the MSG 3 transmission).

While the ra-ContentionResolutionTimer is running, the UE monitors the PDCCH (the UE monitors the PDCCH while the ra-ContentionResolutionTimer is running regardless of the possible occurrence of a measurement gap). When the ra-ContentionResolutionTimer expires, it is considered that contention resolution is not successful.

The modified embodiment in which a specific value of an existing parameter is specified and linked to a new parameter for indicating a long round trip delay value described in the first embodiment may be applied to the above described random access procedure by changing only the parameter.

As described in the second embodiment, the base station may indicate the offset information, and the offset information may be overridden by the ra-ResponseWindow or the ra-ContentionResolutionTimer, or added/subtracted/calculated with them. Alternatively, as in the second embodiment described above, a separate offset timer may be configured and operated.

For example, the base station may configure offset information to the UE to consider a large propagation delay of a non-terrestrial network. In addition, the UE may add the corresponding offset information to the random access timer value or use the offset information as the random access timer value. For example, when a UE capable of the non-terrestrial network communication receives the NTN RTD offset information (or information for calculating it), the window or timer may be configured to be running until the value allocated to the ra-ResponseWindow or the ra-ContentionResolutionTimer plus the NTN RTD offset. Alternatively, when a UE capable of the non-terrestrial network communication receives the NTN RTD offset information (or information for indicating it), the UE ignores the value assigned to the ra-ResponseWindow or the ra-ContennonResolunonTimer and uses the NTN RTD offset to run the ra-ResponseWindow or the ra-ContentionResolutionTimer.

For example, when the NTN RTD offset is configured as 544 ms, and the ra-ResponseWindow is configured as 4 slots (4 ms assuming 15 kHz subcarrier spacing is used), the UE may expire the ra-ResponseWindow when it becomes 544 ms+4 ms.

As another example, when the NTN RTD offset is configured as 544 ms, and the ra-ResponseWindow is configured with 4 slots (4 ms assuming the use of 15 kHz subcarrier spacing), the UE ignores the indicated ra-ResponseWindow value (4 ms). The ra-ResponseWindow value may be used by overriding the value indicated/calculated by the NTN RTD offset (544 ms). For example, if the NTN RTD offset is indicated (or the NTN RTD offset is calculated according to the indication information), the UE may use the corresponding value (544 ms) as the ra-ResponseWindow value.

As another example, regardless of the NTN RTD offset configured as 544 ms, the ra-ContentionResolutionTimer may use a value assigned to ra-ContennonResolunonTimer. For example, if the ra-ContentionResolutionTimer value is configured with 8 subframes (8 ms if 15 kHz subcarrier spacing is used), the UE starts the corresponding timer and may expire the ra-ContentionResolutionTimer at 8 ms.

As still another example, when the NTN RTD offset is configured as 544 ms, and the ra-ContentionResolutionTimer value is configured as 8 subframes (8 ms assuming the use of 15 kHz subcarrier spacing), the UE may expire the ra-ContentionResolutionTimer at 544 ms+8 MS.

The operation of the MAC entity is as follows. The MAC entity shall:

start the ra-ResponseWindow on the first PDCCH occasion specified in TS 38.213 from the end of random access preamble transmission.

While the ra-ResponseWindow is running, it monitors the PDCCH of SpCell for the random access response identified by RA-RNTI.

(Or >while the ra-ResponseWindow is running,

If the ra-ResponseWindow is less than (or less than or equal to) the NTN RTD offset, the MAC entity does not monitor the SpCell's PDCCH for a random access response identified by the RA-RNTI.

If the ra-ResponseWindow is greater than or equal to (or greater than) the NTN RTD offset, the MAC entity monitors the SpCell's PDCCH for the random access response identified by the RA-RNTI.)

If the ra-ResponseWindow configured in RACH-ConfigCommon expires, and the random access response including the random access preamble matching the transmitted PREAMBLE_INDEX has not yet been received (if the ra-ResponseWindow configured in RACH-ConfigCommon expires, and the Random Access Response containing Random Access Preamble identifiers that matches the transmitted PREAMBLE_INDEX has not been received; or If the ra-ResponseWindow configured in the BeamFailureRecoveryConfig expires and if the PDCCH addressed to the C-RNTI has not been received), it is considered that the random access response reception was not successful.

increase PREAMBLE_TRANSMISSION_COUNTER by 1.

Meanwhile, when the MSG 3 is transmitted, the MAC entity operates as follows. The MAC entity shall:

The MAC entity starts the ra-ContentionResolutionTimer (the MAC entity starts the ra-ContentionResolutionTimer and restart the ra-ContentionResolutionTimer at each HARQ retransmission in the first symbol after the end of the MSG 3 transmission).

While the ra-ContentionResolutionTimer is running, the UE monitors the PDCCH (the UE monitors the PDCCH while the ra-ContentionResolutionTimer is running regardless of the possible occurrence of a measurement gap). When the ra-ContentionResolutionTimer expires, it is consider that the contention resolution is not successful. If the ra-ContentionResolutionTimer is less than (or less than or equal to) the NTN RTD offset, the MAC entity does not monitor the PDCCH. If the ra-ContentionResolutionTimer is greater than or equal to (or greater than) the NTN RTD offset, the MAC entity monitors the PDCCH. If it is considered that the contention is not successful (for example, if the PDCCH transmission is addressed to C-RNTI or the UE contention resolution identifier matches the CCCH SDU transmitted from MSG 3), the MAC entity stop the ra-ContentionResolutionTimer.

Meanwhile, the operation of the third embodiment described above may be applied.

For example, in order to consider a large propagation delay of the non-terrestrial network, an offset timer distinct from the typical timer may be indicated. For example, when a UE capable of the non-terrestrial network communication receives the offset timer (or information for calculating it), the UE starts a corresponding timer, and after the offset timer expires, the UE may start the ra-ResponseWindow or the ra-ContentionResolutionTimer. Or, when a UE capable of the non-terrestrial network communication receives the offset information, the ra-ContentionResolutionTimer is started after the corresponding offset expires from a time when the start condition of the ra-ResponseWindow or the ra-ContentionResolutionTimer is satisfied (eg MSG1 transmission or MSG 3 transmission).

For example, when the offset timer (or the offset information) is configured with 544 ms, and the ra-ResponseWindow is configured with 4 slots (4 ms assuming that 15 kHz subcarrier spacing is used), the UE starts a third offset timer when the ra-ResponseWindow in the related art is started (for example, when a random access preamble is transmitted). The UE starts the ra-ResponseWindow when the third offset timer expires after 544 ms.

As another example, when the offset timer is configured with 544 ms, and the ra-ResponseWindow is configured with 4 slots (4 ms assuming 15 kHz subcarrier spacing is used), the UE ignores the indicated ra-ResponseWindow value (4 ms) and override the value indicated/calculated by the NTN RTD offset (544 ms) to the ra-ResponseWindow value so that the former may be used as the later. For example, if the NTN RTD offset is indicated (or the NTN RTD offset is calculated according to the indication information), the UE may use the corresponding value (544 ms) as the ra-ResponseWindow value. In this case, the ra-ResponseWindow may provide the same effect by operating according to the related art.

As another example, when the offset timer is configured as 544 ms, and the ra-ContentionResolutionTimer value is configured as 8 subframes (8 ms assuming the use of 15 kHz subcarrier spacing), the UE ignores the indicated ra-ContentionResolutionTimer value (8 ms) and override the value indicated/calculated by the NTN RTD offset (544 ms) to the ra-ContentionResolutionTimer value so that the former may be used as the later.

As another example, when the offset timer is configured with 544 ms, and the ra-ContentionResolutionTimer may use a value indicated by the ra-ContentionResolutionTimer as it is. For example, if the ra-ContentionResolutionTimer value is configured with 8 slots (8 ms if 15 kHz subcarrier spacing is used), the UE starts the ra-ContentionResolutionTime timer after the offset timer expires, and the ra-ContentionResolutionTimer may expire at 8 ms.

As another example, when the offset timer is configured as 544 ms, and the ra-ContentionResolutionTimer value is configured as 8 subframes (8 ms assuming the use of 15 kHz subcarrier spacing), the UE starts a fourth offset timer when the ra-ContentionResolutionTimer in the related art is started (for example, when the MSG 3 is transmitted). The UE starts the ra-ContentionResolutionTimer when the fourth offset timer expires after 544 ms. The ra-ContentionResolutionTimer expires after 8 ms.

Meanwhile, when the random access preamble is transmitted, the MAC entity operates as follows. The MAC entity shall:

start the third offset timer on the first PDCCH occasion specified in TS 38.213 from the end of random access preamble transmission.

When the third offset timer expires, start the ra-ResponseWindow (or start ra-ResponseWindow on the first PDCCH occasion after the offset elapses at the end of random access preamble transmission).

While the ra-ResponseWindow is running, monitor the PDCCH of SpCell for random access response identified by RA-RNTI.

If the ra-ResponseWindow configured in RACH-ConfigCommon expires, and if a random access response including a random access preamble matching the transmitted PREAMBLE_INDEX has not yet been received (if the ra-ResponseWindow configured in the RACH-ConfigCommon expires, and if the Random Access Response containing Random Access Preamble identifiers that matches the transmitted PREAMBLE_INDEX has not been received; or If the ra-ResponseWindow configured in BeamFailureRecoveryConfig expires and the PDCCH addressed to the C-RNTI has not been received). It is considered that the random access response reception was not successful.

increase PREAMBLE_TRANSMISSION_COUNTER by 1.

In addition, when the MSG 3 is transmitted, the MAC entity operates as follows. The MAC entity shall:

start the fourth offset timer.

When the fourth offset timer expires, start (or restart) the ra-ContentionResolutionTimer.

monitor the PDCCH while the ra-ContentionResolutionTimer is running (monitor the PDCCH while the ra-ContentionResolutionTimer is running regardless of the possible occurrence of a measurement gap).

When the ra-ContentionResolutionTimer expires, it is consider that the contention resolution is not successful.

flush the HARQ buffer used for MAC PDU transmission in the MSG 3 buffer.

Increase the preamble transmission counter by 1.

If it is considered that the contention resolution is successful (for example, if the PDCCH transmission is addressed to C-RNTI or the terminal contention resolution identifier matches the CCCH SDU transmitted from MSG 3), stop the ra-ContentionResolutionTimer.

As described above, the contention-based random access procedure controls the timer operation in the random access procedure in consideration of the reference round trip delay offset.

Figure 16:
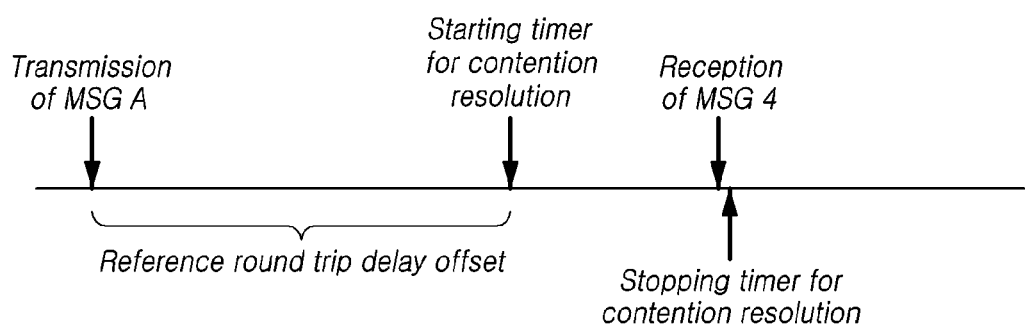
FIG. 16 is a view for describing a timer control operation in a contention-based random access situation according to an embodiment.

FIG. 16 is a view for describing a timer control operation in a contention-based random access situation according to an embodiment.

Referring to FIG. 16, a UE performing a random access procedure to access a non-terrestrial network cell starts a timer for contention resolution after a time duration corresponding to a reference round trip delay offset after transmitting the MSG 3. Thereafter, when the MSG 4 is normally received, the UE stops the timer for the contention cancellation. If the timer for the contention resolution expires before the MSG 4 is received, the UE determines that the random access procedure has failed.

As described above, the method of operating the timer by reflecting the reference round trip delay offset is implemented in various ways such as reflecting the offset information to the existing timer value as in the first to third embodiments, or operating a separate offset timer.

Meanwhile, the operation applying to the embodiments in the above described random access procedure may also be applied to a two-step random access procedure. The two-step random access procedure is a simplification of the typical four step random access procedure into two steps. Since four steps are reduced to two steps, an effect of reducing the delay of the random access process may be expected. Therefore, it may be desirable to use it for non-terrestrial communication. However, in order to support two step random access, the UE must transmit the MSG1 (or random access preamble) and the MSG 3 (or information included in MSG 3, for example, CCCH SDU) of the existing four step random access procedure based on contention at once/simultaneously. Therefore, more resources may be wasted if contention or failure occurs. Therefore, it may be desirable that the two step random access is selectively configured by the base station. Basically, it may be assumed that the two step random access is transmitted by including the MSG1 and the MSG 3 of the four step random access in the contention-based resource in step 1. In step 2, it may be assumed that information included in the MSG2 and the MSG 4 of the four step random access is received.

In this case, if the above described ra-ResponseWindow and/or ra-ContentionResolutionTimer or a new timer is defined, the first to third embodiments described above may be applied to the corresponding parameter. For convenience of explanation, a message including contents of the MSG1 and the MSG 3 is defined as the MSG A, and a message including contents included in the MSG2 and the MSG 4 is defined as the MSG B. For example, the MSG A may transmit a PUSCH including a PRACH preamble and a CCCH SDU together.

The above described operation will be described based on the operation of the MAC entity in the two-step random access procedure.

When the MSG A is transmitted, the MAC entity operates as follows. The MAC entity shall:

start the fifth offset timer.

start two step RACH response window (or two step RACH timer). When the fifth offset timer expires, start the two step RACH response window (or the two step RACH timer) on the first PDCCH occasion after the offset elapses at the end of the MSG A transmission.

monitor the PDCCH while the two step RACH response window (or the two step RACH timer) is running.

When the two step RACH response window (or the two step RACH timer) expires, the contention resolution is considered to be unsuccessful.

flush the HARQ buffer used for MAC PDU transmission in the MSG A buffer.

increase the preamble transmission counter by 1.

If the contention resolution is considered to be successful (e.g., if the PDCCH transmission is addressed to C-RNTI or the UE contention resolution identifier matches the CCCH SDU transmitted from the MSG A), stop the two step RACH response window (Or the two step RACH timer).

Figure 17:
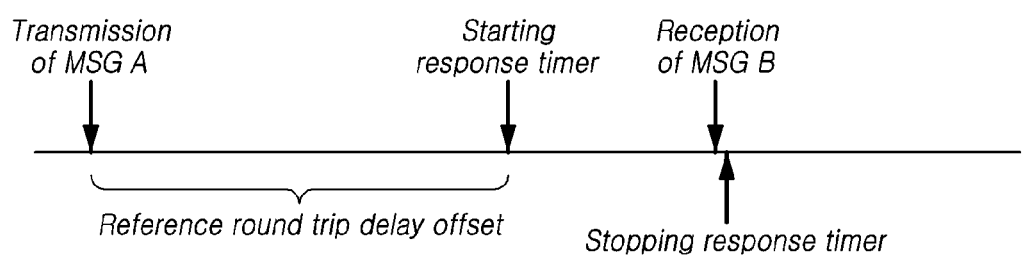
FIG. 17 is a view for explaining a timer control operation in a two-step random access situation according to an embodiment.

FIG. 17 is a view for explaining a timer control operation in a two-step random access situation according to an embodiment.

Referring to FIG. 17, a UE performing a random access procedure to access a non-terrestrial network cell starts a response timer after a time duration corresponding to a reference round trip delay offset after transmitting a MSG A. Thereafter, when a MSG B is normally received, the UE stops the response timer. If the timer for contention resolution expires before the MSG B is received, the UE determines that the random access procedure has failed. Here, the response timer may mean the above described two step RACH response window or two step RACH timer.

As described above, the method of operating the timer by reflecting the reference round trip delay offset is implemented in various ways such as reflecting the offset information to the existing timer value as in the first to third embodiments, or operating a separate offset timer.

Hereinafter, a case in which the present embodiment is applied to a scheduling request (SR) procedure will be exemplarily described.

The scheduling request (SR) is used for requesting UL-SCH resources for new transmission. When the SR is transmitted, the MAC entity of the UE monitors the PDCCH in order to receive a scheduling grant from the base station, and it is also undesirable in terms of power consumption to continuously monitor the PDCCH under a large delay of a non-terrestrial network. Accordingly, the above described embodiments may be applied to the scheduling request procedure.

For example, when one scheduling request is pending after NTN RTD offset after being transmitted on the PUCCH, the UE may monitor the PDCCH. When one scheduling request is transmitted on the PUCCH, the UE starts an offset timer. When the offset timer expires (or after the offset elapses), the UE may monitor the PDCCH. The offset timer is a timer distinct from sr-ProhibitTimer and may be indicated by the base station. The corresponding offset timer may be stopped/cancelled/released when receiving an uplink grant. Alternatively, the offset timer may be stopped/cancelled/released when the uplink grant may accommodate all pending data available for transmission.

As another example, offset information for taking into account a large propagation delay of the non-terrestrial network may be configured in the UE. In addition, the offset information may be added to the sr-ProhibitTimer value or the offset information may be used as the sr-ProhibitTimer value. Through this, it is possible to prevent continuous SR transmission during the round trip delay. For example, when a UE capable of non-terrestrial network communication receives the NTN RTD offset information (or information for calculating a NTN RTD offset), the UE may run the sr-ProhibitTimer up to the value configured in the sr-ProhibitTimer plus the NTN RTD offset. When the UE capable of the non-terrestrial network communication receives the NTN RTD offset information (or information for indicating the NTN RTD of), the UE may ignore the value configured in the sr-ProhibitTimer and operate the sr-ProhibitTimer using the NTN RTD offset. Accordingly, the sr-Prohibit-Timer for the UE supporting the non-terrestrial network may be configured to have a value greater than the NTN RTD offset. Alternatively, the sr-ProhibitTimer for the UE supporting the non-terrestrial network may be configured to have a value in a larger range than the NTN RTD offset.

The offset information or the offset timer in the above described embodiments may be used as common information or a common timer or may be used as an individual timer in each case.

As described above, according to the present disclosure, it is possible to effectively perform the NR MAC procedure in a propagation delay environment of the non-terrestrial network.

Hereinafter, structural configuration of a UE and a network node capable of performing some or all of the operations of each of the above described embodiments will be described again with reference to the accompanying drawings.

Figure 18:
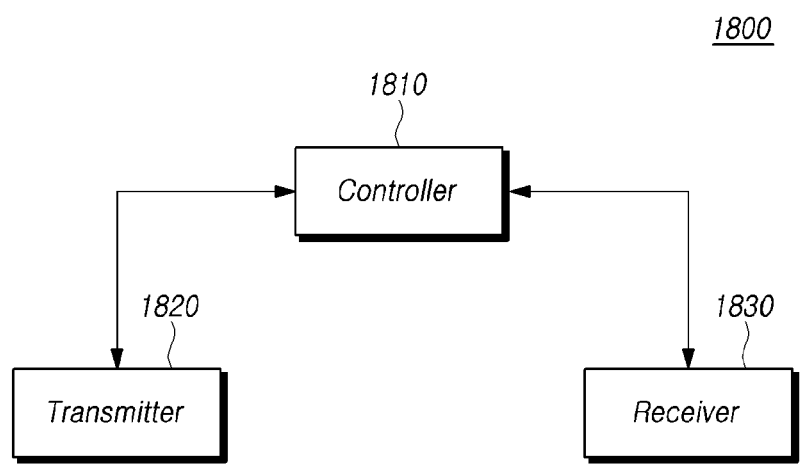
FIG. 18 is a block diagram illustrating a UE according to an embodiment.

FIG. 18 is a block diagram illustrating a UE according to an embodiment.

Referring to FIG. 18, a UE 1800 performing communication using a non-terrestrial network may include a receiver 1830 and a controller 1810. The receiver 1830 may be configured to receive system information including reference round trip delay offset information of a non-terrestrial network cell and configuration information that is necessary to perform communication by using the non-terrestrial network cell. The controller 1830 may be configured to perform a random access procedure in the non-terrestrial network cell and control a discontinuous reception (DRX) operation based on the configuration information.

For example, the reference round trip delay offset information may be determined based on a signal transmission time between the UE and the network node. According to an embodiment, the reference round trip delay offset information may be determined based on a time difference at which a signal transmitted by the UE or the network node is received by the network node or the UE, respectively. According to another embodiment, the reference round trip delay offset information may be determined based on a time difference at which a response signal for a signal transmitted from the UE is received by the UE. The reference round trip delay offset information may be included in system information explicitly or implicitly.

The controller 1830 may perform a random access procedure in the non-terrestrial network cell.

According to an embodiment, the UE 1800 may further include a transmitter 1820 configured to transmit a message 3 (MSG 3) in the case of a contention-based random access procedure. After the receiver 1830 receives the system information, the controller 1810 may start a timer for contention resolution when a time according to the reference round trip delay offset information elapses after transmission of the message 3 and stops the timer when the contention resolution is complete. That is, if the time corresponding to the reference round trip delay offset elapses after message 3 is transmitted, the UE monitors whether to receive a message 4 (MSG 4) or not. In order to determine whether contention is resolved, the controller 1810 starts a timer for contention resolution when the time corresponding to the reference round trip delay offset elapses after the message is transmitted and stops the corresponding timer when the message 4 is normally received to complete the random access procedure.

According to another embodiment, the transmitter 1820 may configure to transmit a message A (MSG A) in the case of a two-step random access procedure. The controller 1810 may start a response timer when a time according to the reference round trip delay offset information elapses after transmission of the message A and stops the response timer when a message B, which is a response message to the message A, is received. That is, in the case of performing the two-step random access procedure consisting of transmission of a message A and reception of a message B, the transmitter 1820 may transmit the message A and start a response timer when the time corresponding to the reference round trip delay offset elapses to monitor whether to receive the message B. Thereafter, when the message B is normally received, the controller 1810 stops the response timer and completes the random access procedure.

The configuration information may include a discontinuous reception HARQ RTT (drx HARQ Round Trip Time) timer or a SR (Scheduling Request) prohibition timer. The discontinuous reception HARQ RTT (drx HARQ Round Trip Time) timer or the SR (Scheduling Request) prohibition timer is configured to a value greater than the reference round trip delay offset.

The controller 1810 may perform a discontinuous reception (DRX) operation using a timer and the like included in the system information.

As an example, the controller 1810 performs the DRX operation using a HARQ RTT(drx HARQ Round Trip Time) timer. The receiver 130 may receive indication information indicating to disable the HARQ feedback operation. The controller 1810 may make the discontinuous reception HARQ RTT (drx HARQ Round Trip Time) timer disabled when a disable indication for a HARQ feedback operation is received.

As another example, the controller 1810 may perform a scheduling request operation based on a scheduling request (SR) prohibition timer.

In this way, the controller 1810 may use the reference round trip delay offset information received from the base station in the MAC procedure to reflect an increase in the delay time according to the non-terrestrial network.

The transmitter 1820 and the receiver 1830 are used to transmit or receive signals, messages, or data necessary for performing the above described embodiments, with the network node.

Figure 19:
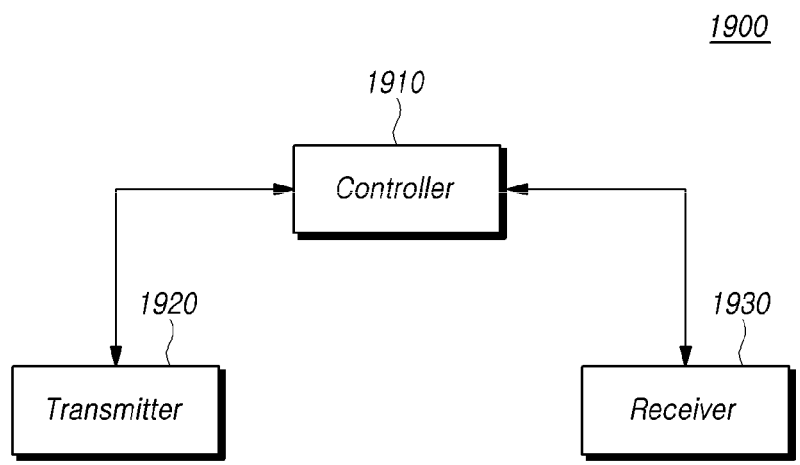
FIG. 19 is a block diagram illustrating a network node according to an embodiment.

FIG. 19 is a block diagram illustrating a network node according to an embodiment.

Referring to FIG. 19, a base station 1900 performing communication using a non-terrestrial network with a user equipment (UE) may include a transmitter 1920 and a controller 1910. The transmitter 1920 may transmit system information comprising reference round trip delay offset information of a non-terrestrial network cell and system information comprising reference round trip delay offset information of a non-terrestrial network cell. The controller 1910 may perform a random access procedure with the UE in the non-terrestrial network cell For example, the reference round trip delay offset information may be determined based on a signal transmission time between the UE 1800 and the network node 1900. According to an embodiment, the reference round trip delay offset information may be determined based on a time difference at which a signal transmitted by the UE 1800 or the network node 1900 is received by the network node 1900 or the UE 1800, respectively. According to another embodiment, the reference round trip delay offset information may be determined based on a time difference at which a response signal for a signal transmitted from the UE 1800 is received by the UE 1800. The reference round trip delay offset information may be included in the system information explicitly or implicitly.

The controller 1910 may perform the random access procedure with the UE 1800 accessing the network node 1900 using the non-terrestrial network.

As an example, the receiver 1930 receives a message 3 (MSG 3) from the UE in the case of a contention-based random access procedure. The UE starts a timer for contention resolution when a time according to the reference round trip delay offset information elapses after transmission of the message 3. The transmitter 1920 may receive a message 4(MSG 4) including a response information for the message 3. The UE stops the corresponding timer when the message 4 is normally received to complete the random access procedure. That is, if the time corresponding to the reference round trip delay offset elapses after message 3 is transmitted, the UE monitors whether to receive a message 4 or not.

As another example, the receiver 1930 receives a message A (MSG A) in the case of a two-step random access procedure. The UE starts a response timer when a time according to the reference round trip delay offset information elapses after transmission of the message A. The transmitter 1920 transmits a message B, which is a response message to the message A to the UE. When the UE receives the message B, the UE stops the response timer. That is, in the case of performing the two-step random access procedure consisting of transmission of a message A and reception of a message B, the UE may transmit the message A and starts a response timer when the time corresponding to the reference round trip delay offset elapses to monitor whether to receive the message B. Thereafter, when the message B is normally received, the UE stops the response timer and completes the random access procedure.

The configuration information may include a discontinuous reception HARQ RTT (drx HARQ Round Trip Time) timer or a SR (Scheduling Request) prohibition timer. The discontinuous reception HARQ RTT (drx HARQ Round Trip Time) timer or the SR (Scheduling Request) prohibition timer may be also configured to a value greater than the reference round trip delay offset.

The transmitter 1920 may transmit indication information disabling a HARQ feedback operation to the UE. The UE makes the discontinuous reception HARQ RTT (drx HARQ Round Trip Time) timer disabled when the indication information is received. As an example, the UE performs the DRX operation based on the HARQ RTT(drx HARQ Round Trip Time) timer. The UE may make the discontinuous reception HARQ RTT (drx HARQ Round Trip Time) timer disabled when a disable indication for a HARQ feedback operation is received. That is, when the network node 1900 indicates to disable the HARQ feedback operation, the UE disables the discontinuous reception HARQ RDD (drx HARQ Round Trip Time) timer and does not perform the HARQ feedback operation. As another example, the UE may perform a scheduling request operation based on a scheduling request (SR) prohibition timer.

In addition, the controller 1910 controls the overall operation of the network node 1900 according to controlling the MAC procedure of the UE in consideration of the round trip delay offset in the non-terrestrial network required to perform the above described embodiment.

The transmitter 1920 and the receiver 1930 are used to transmit or receive signals, messages, or data necessary for performing the above described embodiments, with the UE.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the disclosure shall be construed on the basis of the accompanying claims in such a manner that all of the technical ideas included within the scope equivalent to the claims belong to the disclosure.

CROSS-REFERENCE TO RELATED APPLICATION

This application claims priority from Korean Patent Application Nos. 10-2018-0119338, filed on Oct. 5, 2018, and 10-2019-0118534, filed on Sep. 26, 2019, which are hereby incorporated by reference for all purposes as if fully set forth herein. In addition, if this patent application claims priority for countries other than the United States for the same reason as above, all the contents are incorporated into this patent application by reference.

The invention claimed is:

1. A method for performing communication using a non-terrestrial network by a user equipment (UE), the method comprising:
   receiving system information comprising reference round trip delay offset information of a non-terrestrial network cell;
   performing a random access procedure in the non-terrestrial network cell;
   receiving configuration information for performing communication using the non-terrestrial network cell; and
   controlling a discontinuous reception (DRX) operation based on the configuration information,
   wherein the reference round trip delay offset information is used to calculate a round trip delay between the UE and a network node in the non-terrestrial network cell, and
   wherein the performing the random access comprises:
   transmitting a message 3 (MSG 3) for a contention-based random access procedure;
   starting a timer for contention resolution when a time according to the round trip delay between the UE and the network node calculated using the reference round trip delay offset information elapses after transmission of the message 3.

2. The method of claim 1, wherein the controlling the discontinuous reception (DRX) operation comprises:
   when a scheduling request is transmitted and pending on PUCCH (Physical Uplink Control Channel), controlling an active time to start when the time corresponding to the round trip delay between UE and the network node elapses after the scheduling request is transmitted.

3. The method of claim 1, wherein the configuration information comprises a discontinuous reception HARQ RTT (drx HARQ Round Trip Time) timer, and
   the discontinuous reception HARQ RTT (drx HARQ Round Trip Time) timer is configured using the reference round trip delay between the UE and the network node.

4. The method of claim 3, wherein the discontinuous reception HARQ RTT (drx HARQ Round Trip Time) timer disabled when a disable indication for a Downlink HARQ feedback operation is received.

5. A method for performing communication using a non-terrestrial network with a user equipment (UE) by a network node, the method comprising:
   transmitting system information comprising reference round trip delay offset information of a non-terrestrial network cell;
   performing a random access procedure with the UE in the non-terrestrial network cell; and
   transmitting configuration information for performing communication using the non-terrestrial network cell,
   wherein the reference round trip delay offset information is used to calculate a round trip delay between the UE and a network node in the non-terrestrial network cell, and
   wherein the performing the random access comprises:
   receiving a message 3 (MSG 3) from the UE for a contention-based random access procedure, and
   the UE starts a timer for contention resolution when a time according to the round trip delay between the UE and the network node calculated using the reference round trip delay offset information elapses after transmission of the message 3.

6. The method of claim 5, wherein the UE comprises:
   controlling the discontinuous reception (DRX) operation based on the configuration information,
   when a scheduling request is transmitted and pending on PUCCH (Physical Uplink Control Channel), controlling an active time to start when the time corresponding to the round trip delay between UE and the network node elapses after the scheduling request is transmitted.

7. The method of claim 5, wherein the configuration information comprises a discontinuous reception HARQ RTT (drx HARQ Round Trip Time) timer, and
   the discontinuous reception HARQ RTT (drx HARQ Round Trip Time) timer is configured using the reference round trip delay between the UE and the network node.

8. The method of claim 7, wherein the discontinuous reception HARQ RTT (drx HARQ Round Trip Time) timer disabled when a disable indication for a Downlink HARQ feedback operation is received.

9. A user equipment (UE) performing communication using a non-terrestrial network, the UE comprising:
   a receiver configured to receive system information comprising reference round trip delay offset information of a non-terrestrial network cell and configuration information for performing communication using the non-terrestrial network cell; and
   a controller configured to perform a random access procedure in the non-terrestrial network cell and control a discontinuous reception (DRX) operation based on the configuration information,
   wherein the reference round trip delay offset information is used to calculate a round trip delay between the UE and a network node in the non-terrestrial network cell, and
   further comprises a transmitter configured to transmit a message 3 (MSG 3) for a contention-based random access procedure,
   wherein the controller start a timer for contention resolution when a time according to the round trip delay between the UE and the network node calculated using the reference round trip delay offset information elapses after transmission of the message 3.

10. The UE of claim 9, when a scheduling request is transmitted and pending on PUCCH (Physical Uplink Control Channel),
    wherein the controller configured to control an active time to start when the time corresponding to the round trip delay between UE and the network node elapses after the scheduling request is transmitted.

11. The UE of claim 9, wherein the configuration information comprises a discontinuous reception HARQ RTT (drx HARQ Round Trip Time) timer, and
    the discontinuous reception HARQ RTT (drx HARQ Round Trip Time) timer is configured using the reference round trip delay between the UE and the network node.

12. The UE of claim 11, wherein the discontinuous reception HARQ RTT (drx HARQ Round Trip Time) timer disabled when a disable indication for a Downlink HARQ feedback operation is received.

* * * * *